(12) United States Patent
Choi et al.

(10) Patent No.: US 8,774,736 B2
(45) Date of Patent: Jul. 8, 2014

(54) ANTENNA SWITCHING FOR DATA TRANSMISSION IN A COMMUNICATION SYSTEM USING A PLURALITY OF TRANSMISSION ANTENNAS

(75) Inventors: Jin Soo Choi, Anyang-si (KR); Min Seok Oh, Anyang-si (KR); Hyung Ho Park, Anyang-si (KR); Sung Ho Moon, Anyang-si (KR); Eun Jong Lee, Anyang-si (KR); Kyu Jin Park, Anyang-si (KR); Doo Hyun Sung, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 370 days.

(21) Appl. No.: 12/449,240

(22) PCT Filed: Jan. 21, 2008

(86) PCT No.: PCT/KR2008/000363
§ 371 (c)(1),
(2), (4) Date: Jul. 30, 2009

(87) PCT Pub. No.: WO2008/093952
PCT Pub. Date: Aug. 7, 2008

(65) Prior Publication Data
US 2010/0069028 A1    Mar. 18, 2010

Related U.S. Application Data

(60) Provisional application No. 60/888,049, filed on Feb. 2, 2007, provisional application No. 60/914,386, filed on Apr. 27, 2007, provisional application No. 60/915,501, filed on May 2, 2007.

(30) Foreign Application Priority Data

Mar. 2, 2007 (KR) .......................... 10-2007-0020911
Jun. 21, 2007 (KR) .......................... 10-2007-0061002

(51) Int. Cl.
*H04B 1/02* (2006.01)

(52) U.S. Cl.
USPC ............. 455/101; 455/69; 370/334; 375/267; 375/347; 375/358

(58) Field of Classification Search
CPC ..... H04W 52/42; H04W 84/12; H04W 88/06; H04W 28/22; H04W 52/24; H04W 52/267; H04W 52/325; H04W 52/346; H04W 72/1231; H04W 72/1278; H04W 16/14; H04W 16/28; H04W 24/02; H04W 24/04; H04W 28/04; H04W 28/06; H04W 28/16; H01L 1/0618; H01L 25/0204; H01L 1/0026; H01L 1/06; H01L 1/0003; H01L 5/0023; H01L 5/006; H01L 1/0009; H01L 1/0625; H01L 2025/03414; H01L 2025/03426; H01L 1/0001; H01L 1/0002; H01L 1/0015; H01L 1/0693; H01L 1/1867; H04B 7/0634; H04B 7/061; H04B 7/0617; H04B 7/0669; H04B 7/0691; H04B 7/0689; H04B 7/0626; H04B 7/0408; H04B 7/0417; H04B 7/0656; H04B 7/0654; H04B 7/0639; H04B 7/0805; H04B 7/0854; H04B 7/10; H04B 7/0615; H04B 7/0632
USPC ................ 455/69, 522, 101, 517, 519, 562.1, 455/67.7, 63.7, 67.11, 134, 25, 132, 129, 455/193.1, 114.1, 295; 370/334, 335, 338, 370/252, 310, 329, 342, 203, 209, 210, 317, 370/320, 326, 331, 337, 343, 348, 437; 375/144, 152, 267, 299, 346, 141, 375/146–149, 260, 269, 295, 296, 298, 344
See application file for complete search history.

(56) References Cited

U.S. PATENT DOCUMENTS

| | | | |
|---|---|---|---|
| 5,628,052 A * | 5/1997 | DeSantis et al. | 455/562.1 |
| 7,957,759 B2 * | 6/2011 | Papasakellariou | 455/522 |
| 2005/0014474 A1 * | 1/2005 | Jitsukawa et al. | 455/101 |
| 2005/0105657 A1 | 5/2005 | Kroeger et al. | |
| 2006/0105710 A1 * | 5/2006 | Imamura et al. | 455/39 |
| 2006/0223476 A1 | 10/2006 | Song et al. | |
| 2007/0258393 A1 * | 11/2007 | Cam-Winget et al. | 370/310 |

Antenna selection index based on channel quality of transport layer

FOREIGN PATENT DOCUMENTS

| | | |
|---|---|---|
| DE | 44 03 612 | 8/1995 |
| EP | 1 533 918 | 5/2005 |
| EP | 1 662 686 A1 | 5/2006 |
| JP | 2005-159539 A | 6/2005 |
| JP | 2007-511980 A | 5/2007 |
| WO | WO 2006/104358 A1 | 10/2006 |
| WO | WO 2008/023811 A1 | 2/2008 |

OTHER PUBLICATIONS

U.S. Appl. No. 60/869,255, "Wideband reference signal transmission in SC-FDMA communication system".*

Mitsubishi Electric, NTT DoCoMo, Performance comparison of training schemes for uplink transmit antenna selection, 3GPP TSG-RAN WG1 #47 R1-063090, Nov. 10, 2006.

Mitsubishi Electric, NTT DoCoMo, Low cost training for transmit antenna selection on the uplink, 3GPP TSGRAN WG1 #46bis R1-062941, Oct. 13, 2006.

Mitsubishi Electric, NTT DoCoMo, Performance comparison of training schemes for uplink transmit antenna selection, 3GPP TSGRAN WG1 #46bis R1-062942, Oct. 13, 2006.

NTT DoCoMo, Fujitsu, KDDI, Panasonic, Toshiba Corporation, Multiplexing Method for Orthogonal Reference Signals for E-UTRA Uplink, 3GPP TSG-RAN WG1 #47 R1-063307, Nov. 10, 2006.

* cited by examiner

*Primary Examiner* — Golam Sorowar

(74) *Attorney, Agent, or Firm* — Mckenna Long & Aldridge LLP

(57) ABSTRACT

A closed-loop antenna switching method, a reference signal allocating method, and a feedback signal transmitting method for the same are disclosed. Namely, by transmitting a reference signal via the plurality of transmitting antennas via the antenna switching for reference signal transmission for each prescribed multiple period of an antenna selection period, efficient antenna index information can be fed back. By setting an antenna switching period to a prescribed multiple of an antenna selection period, it is able to prevent power loss and data decoding performance degradation. And, the present invention includes transmitting a sounding reference signal (SRS) for each band selection period via at least one of the plurality of transmitting antennas and transmitting at least one data demodulation reference signal (DMRS) between the band selection periods via an antenna for not transmitting data by reference signal transmission antenna switching.

6 Claims, 16 Drawing Sheets

Antenna selection index based
on channel quality of transport layer

ANTENNA SWITCHING FOR DATA TRANSMISSION IN A COMMUNICATION SYSTEM USING A PLURALITY OF TRANSMISSION ANTENNAS

This application claims priority to International Application No. PCT/KR2008/000363 filed on Jan. 21, 2008, which claims priority to Korean Patent Application No. 10-2007-0020911, filed on Mar. 2, 2007, Korean Patent Application No. 10-2007-0061002, filed Jun. 21, 2007, U.S. Provisional Application No. 60/888,049, filed Feb. 2, 2007, U.S. Provisional Application No. 60/914,386, filed Apr. 27, 2007 and U.S. Provisional Application No. 60,915,501, filed May 2, 2007, all of which are incorporated by reference for all purposes as if fully set forth herein.

TECHNICAL FIELD

The present invention relates to antenna switching in multiple transmitting and receiving antenna (MIMO) communication system, and more particularly, to a closed-loop antenna switching method, a reference signal allocating method, and a feedback signal transmitting method for the same. Although the present invention is suitable for a wide scope of applications, it is particularly suitable for performing antenna switching efficiently in MIMO communication system using a feedback signal.

BACKGROUND ART

Generally, in MIMO communication system, a transmitting antenna switching system is used as a method for securing spatial diversity. This transmitting antenna switching system can be mainly categorized into an open-loop antenna switching system and a closed-loop antenna switching system in accordance with whether feedback information indicating a channel status per each antaean is used or not.

FIG. 1 is a block diagram for a configuration of an open-loop antenna switching system. open-loop antenna switching system.

Referring to FIG. 1, in an open-loop antenna switching system, a transmitting side randomly selects an antenna for transmitting data and then transmits data and reference signals. The open-loop antenna switching system employs a structure that uses the small number of RF chains in switching transmitting antennas to transmit data in an overall system for transmission and reception using a plurality of transmitting and receiving antennas.

In particular, a resource allocation module 101 plays a role in deciding and sending a frequency or time and space (antenna) for transmitting data and reference signals. And, a switching module 102 enables the data and reference signals received from the resource allocation module 101 to be transmitted via a randomly selected antenna for each transmission. In this case, a plurality of transmitting antennas are available and the number of the RF chains can range from one to the maximum number of the transmitting antennas.

The above-described antenna switching system is provided to obtain spatial diversity in transmitting data using transmitting antennas alternately in an environment difficult to have transmitting RF chains enough (e.g., in an uplink system, a user equipment (UE) is difficult to have a multitude of RF chains).

FIG. 2 is a diagram for details in operating a resource allocation module and a switching module in the open-loop antenna switching system shown in FIG. 1.

FIG. 2 depicts a method of transmitting data and reference signals (carried between data signals) as packets in a system having two transmitting antennas and a single RF chain, in which the packet may have a single subcarrier structure or a structure that utilizes a plurality of subcarriers in such a system as OFDM system. An arrow shown in FIG. 2 indicates that an antenna is switched.

DISCLOSURE OF THE INVENTION

Technical Problem

However, in the above-configured open-loop antenna switching system, since a single antenna (or the small number of antennas) is usable for simultaneous transmission of data and reference signals, it is unable to simultaneously send the data and reference signals via two or more antennas. So, in this system, antenna(s) is randomly selected to be used for the data and reference signal transmission in certain timing and data and reference signals are transmitted via the selected antenna(s). In this case, since it is unable to know which channel for each antenna is better without feedback information, the open-loop system, which performs transmission via the randomly selected antenna(s), has performance worse than that of an antenna switching system that utilizes feedback information.

Technical Solution

Accordingly, the present invention is directed to a closed-loop antenna switching method, a reference signal allocating method, and a feedback signal transmitting method for the same that substantially obviate one or more of the problems due to limitations and disadvantages of the related art.

An object of the present invention is to provide a closed-loop antenna switching method and system using feedback information based on a channel quality in accordance with each transmitting antenna in antenna switching.

Another object of the present invention is to provide an antenna switching method, a reference signal allocating method, and a feedback information transmitting method for the same, by which power loss generated from antenna switching can be reduced in a manner of adjusting a method of transmitting a reference signal to obtain the feedback information.

Another object of the present invention is to provide a signal transmitting method and an antenna selection information generating method using the same, by an antenna switching gain is raised in a manner of decreasing a delay required for a reference signal acquisition used for antenna switching.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in a communication system using plurality of transmitting antennas, a method of performing antenna switching for data transmission according to the present invention comprising performing subsidiary antenna switching for reference signal transmission for each prescribed period having multiple length of an antenna selection period, and transmitting a reference signal via the plurality of transmitting antennas by said subsidiary antenna switching;

receiving a feedback signal received for the antenna selection period each in response to the transmitted reference signal; and performing the antenna switching for data transmission by selecting an antenna for transmitting data from the plurality of antennas for the each antenna selection period by using the received feedback signal, is presented.

Preferably, a number of the transmitting antennas capable of transmitting the data simultaneously among the plurality of transmitting antennas is equal to or smaller than a prescribed number.

And, preferably, said transmitting the reference signal comprises: transmitting a first reference signal via a first transmitting antenna transmitting the data among the plurality of transmitting antennas within the prescribed period; and transmitting a second reference signal via at least one second transmitting antenna not transmitting the data among the plurality of transmitting antennas within the prescribed period, by said subsidiary antenna switching for the reference signal transmission.

For above cases, a number of reference signals within a transmission unit for transmitting the data may be equal to or greater than a number of the plurality of transmitting antennas.

And, the transmission unit may be either at least one transmission time interval (TTI) or at least one sub-slot.

And, the prescribed period may be 'n' times longer period than the antenna selection period, and a length of the prescribed period may be determined by considering at least one of mobility of a user and a length of the antenna selection period ('n' is a integer number equal to or greater than 2).

To further achieve these and other advantages and in accordance with the purpose of the present invention, a method of transmitting a feedback signal for antenna switching, the method comprising: receiving a reference signal transmitted via a plurality of transmitting antennas by a subsidiary antenna switching for reference signal transmission for each prescribed period having multiple length of an antenna selection period; and transmitting the feedback signal for selecting an antenna for transmitting data from the plurality of transmitting antennas for each antenna selection period in response to the received reference signal, is presented.

In this case, said transmitting the feedback signal may comprise: transmitting the feedback signal for selecting the antenna for transmitting the data using reference signals transmitted via the plurality of transmitting antennas at a first type transmission timing, wherein the first type transmission timing is a timing corresponding to the prescribed period, and receiving all the reference signals transmitted via the plurality of transmitting antennas.

Preferably, the method further comprises: storing channel information acquired using the received reference signals transmitted via the plurality of transmitting antennas at a first type transmission timing.

In this case, said transmitting the feedback signal may comprise: transmitting the feedback signal for selecting an antenna for transmitting the data using one or more of a received reference signal transmitted via a first antenna of the plurality of transmitting antennas, the first antenna transmitting the data at a second type transmission timing, and the stored channel informations acquired using a reference signal transmitted via a second antenna of the plurality of transmitting antennas not transmitting the data at the second type transmission timing, wherein the second type transmission timing is a timing corresponding to the antenna selection period, but not corresponding to the prescribed period.

To further achieve these and other advantages and in accordance with the purpose of the present invention, a method of transmitting a signal, which is for antenna switching in a communication system using a plurality of transmitting antennas, the method comprising: transmitting a sounding reference signal (SRS) for each band selection period via at least one of the plurality of transmitting antennas; and transmitting at least one data demodulation reference signal (DMRS) between the band selection periods via an antenna not transmitting data by reference signal transmission antenna switching, is presented.

In this case, the data demodulation reference signal may be transmitted on a first frequency band selected from a total frequency band in a first antenna not transmitting the data so that the first frequency band corresponds to a second band selected by a band selection for data transmission in a second antenna transmitting the data.

And, the data demodulation reference signal may be transmitted at least once each time the band selection is carried out between the band selection periods.

And, the sounding reference signal may be alternately transmitted via an antenna transmitting the data for the each band selection period or via at least one of a plurality of antennas for the each band selection period.

And, said transmitting the data demodulation reference signal may be carried out for a period differing in accordance with mobility of a user.

To further achieve these and other advantages and in accordance with the purpose of the present invention, a method of generating antenna selection information, the method comprising: receiving a sounding reference signal (SRS) via at least one antenna for each band selection period; receiving at least one data demodulation reference signal (DMRS) transmitted via an antenna not transmitting data using reference signal transmission antenna switching; and generating the antenna selection information using the sounding reference signal and the data demodulation reference signal, is presented.

And, if the sounding reference signal and the data demodulation reference signal are received via antennas different from each other between the band selection periods, said generating the antenna selection information may be carried out using the sounding reference signal received in a preceding band selection period and the data demodulation reference signal received between a current band selection period and the preceding band selection period.

On the other hand, if the sounding reference signal and the data demodulation reference signal are received via antennas different from each other between the band selection periods, said generating the antenna selection information may be carried out using the sounding reference signal received in a current band selection period and the data demodulation reference signal received between a preceding band selection period and the current band selection period.

And, said generating the antenna selection information may be carried out for the each band selection period, and wherein the generated antenna selection information may be transmitted together with band selection information generated in the band selection period.

And, preferably, said generating the antenna selection information is carried out between the band selection periods, and wherein the generated antenna selection information is transmitted separately from band selection information generated in the band selection period.

To further achieve these and other advantages and in accordance with the purpose of the present invention, a method of transmitting a signal, which is for antenna switching, the method comprising: transmitting a sounding reference signal (SRS) for each band selection period via at least one antenna;

and transmitting at least one data demodulation reference signal (DMRS) between the band selection periods via an antenna not transmitting the sounding reference signal in a preceding band selection period using a subsidiary antenna switching for reference signal transmission, is presented.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, according to one embodiment of the present invention, in case that a reference signal is transmitted via each transmitting antenna through additional antenna switching for each antenna index feedback period, unlike an open-loop system, an antenna index to be used by a transmitting side is quickly received as feedback information and is then utilized for transmission. Hence, system performance is enhanced in a manner that data can be transmitted via antenna(s) undergoing a better channel.

Secondly, according to another embodiment of the present invention, in case that a reference signal is transmitted via each transmitting antenna by using additional switching for a prescribed period having 2 or more times longer length than that of an antenna index feedback period, it is able to reduce power loss generated from additional antenna switching. And, more reference signals are usable for data decoding by each transmission unit, whereby system performance can be further enhanced.

And, link performance degradation can be minimized by efficiently selecting the additional antenna switching period in accordance with a speed of user and/or a length of an antenna index feedback period.

Thirdly, according to the embodiments of the present invention, a delay required for reference signal acquisition used for antenna switching can be reduced. Hence, the present invention is able to solve a Doppler frequency problem and the like due to information acquisition delay used for the antenna switching.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

First of all, according to one embodiment of the present invention, in order to solve the problem that an open-loop antenna switching system is unable to secure sufficient spatial diversity, a closed-loop antenna switching system for selecting a transmitting antenna using feedback information for each transmitting antenna is adopted.

Figure 3:
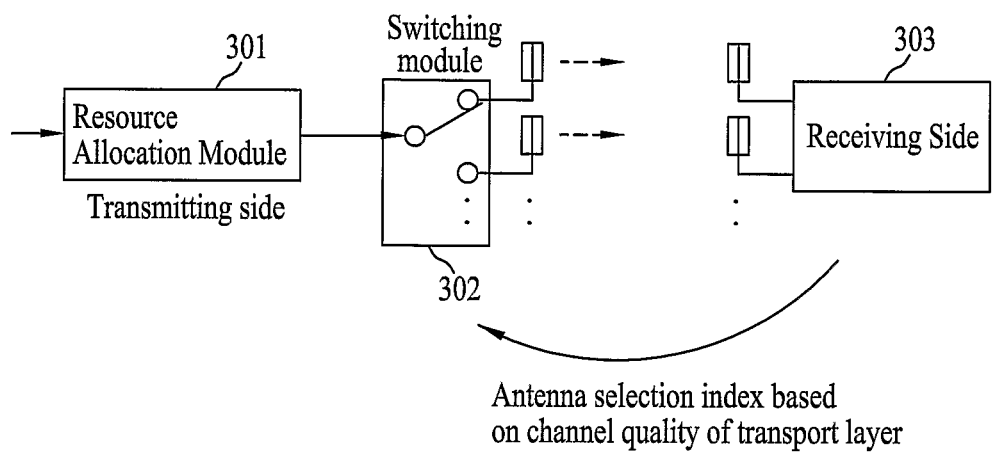
FIG. 3 is a block diagram of a closed-loop antenna switching system according to one embodiment of the present invention.

FIG. 3 is a block diagram of a closed-loop antenna switching system according to one embodiment of the present invention.

In particular, FIG. 3 depicts a structure that a small number of RF chains are used in transmitting data and reference signals in an overall system for transmission and reception using a plurality of transmitting and receiving antennas. In this system, a switching module 302 switches a transmitting antenna by utilizing feedback antenna index information from a receiving side 303.

Referring to FIG. 3, a transmitting side transmits data via an antenna selected by utilizing antenna index information fed back by the receiving side 303. The receiving side 303 determines an antenna index to be used by the transmitting side and then feeds back the determined antenna index to the transmitting side. In this case, a reference for determining the antenna index to be fed back can exist in various ways including a method of selecting an antenna having a best channel quality by measuring a quality of a channel undergone by each antenna, a method of selecting an antenna maximizing a system capacity, and the like.

Meanwhile, a resource allocation module 301 plays a role in allocating a frequency or a time and a space (antenna) resources for transmitting data and/or reference signals. And, a switching module 302 transmits the data and/or reference signals received from the resource allocation module 301 by utilizing the selected antenna using the antenna index information fed back by the receiving side 303. In this case, the number of the transmitting antennas can be plural and the number of RF chains can range 1 to the maximum number of the transmitting antennas.

The object of the present system is to effectively obtain spatial diversity in transmitting data by selecting more accurate transmitting antenna using feedback information in an environment difficult to have sufficient transmitting RF chains (e.g., uplink system). If the system shown in FIG. 3 is utilized, it is able to effectively obtain spatial diversity, which is as good as using a plurality of antennas, by raising accuracy of feedback information but reducing the number of RF chains used in transmitting data.

Meanwhile, the operations of the resource allocation module and the switching module in the above-described closed-loop antenna switching system are explained with reference to detailed examples as follows.

Figure 4:
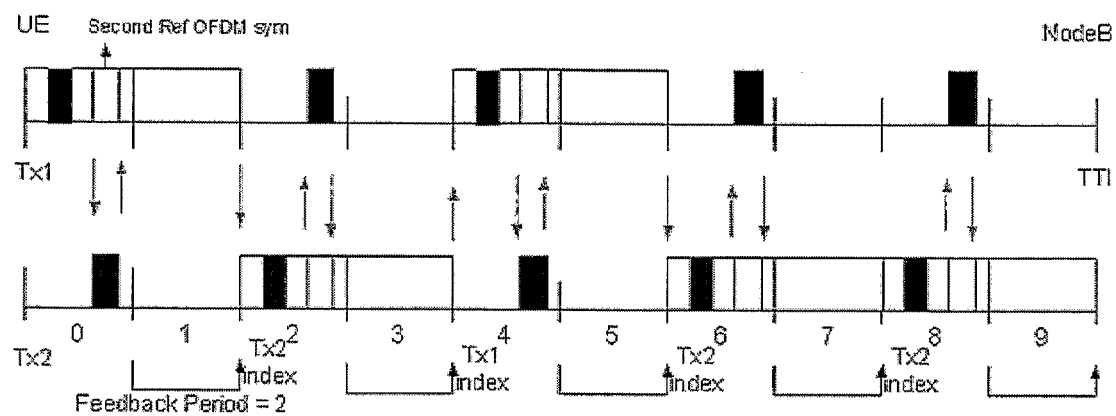
FIG. 4 is a diagram for details in operating a resource allocation module and a switching module in the closed-loop antenna switching system shown in FIG. 3, in which two transmitting antennas are used.

FIG. 4 is an exemplary diagram for details in operating a resource allocation module and a switching module in the closed-loop antenna switching system shown in FIG. 3, in which two transmitting antennas are used.

In particular, FIG. 4 depicts which antenna is used to transmit data and/or reference signals by a reference signal allocating method according to one embodiment of the present invention in a system having two transmitting antennas Tx1 and Tx2 and a single RF chain (i.e., a system having a single antenna capable of simultaneously transmitting data and/or reference signal). And, it is assumed that a delay time for an antenna index to be fed back from a receiving side amounts to a time for transmitting a single packet. In this case, a packet may have a single subcarrier structure or a structure that utilizes a plurality of subcarriers like OFDM system.

Each arrow shown in FIG. 4 indicates that an antenna is switched. In FIG. 4, a thin-colored portion indicates a portion for carrying data, a thick-colored portion indicates a portion for carrying a reference signal, and an uncolored portion within a packet indicates a portion that does not carry data and reference signal.

Meanwhile, there can exist at least one or more reference signals within a packet for carrying data (e.g., TTI (transmission time interval)). A packet can be constructed with a plurality of sub-slots, and at least one or more reference signals can exist in each of the sub-slots. Preferably, according to one embodiment of the present invention, the number of reference signals included within a single packet is equal to or greater than that of antennas, which will be explained with reference to FIG. 5 later.

Operations of a resource allocation module and a switching module are explained with reference to FIG. 4 as follows.

First of all, a switching module of a transmitting side performs switching in each feedback period for feeding back an antenna index determined by a receiving side to the transmitting side in a manner that one or more reference signals are not transmitted via an antenna for transmitting data and that such reference signal are transmitted via another antenna not used for transmitting the data by additional antenna switching. This additional antenna switching can be referred as "subsidiary antenna switching" in a point of view that the antenna switching is mainly for selecting antenna for transmitting data.

Of course, a reference signal transmitted via an antenna for performing data transmission exists within a packet corresponding to a feedback reception period, so reference signals can be transmitted via each of all the antennas within each feedback reception period.

In the present embodiment, a period for receiving feedback information can include a single TTI up to a plurality of TTIs. FIG. 4 shows an example that a feedback information reception period includes two TTIs.

Meanwhile, the receiving side receives reference signals transmitted via the respective antennas for each period, selects an antenna index (e.g., antenna index having a best channel quality) to be used for a next data transmission, and then feeds back the selected antenna index to the transmitting side. So, the transmitting side receives the feedback information after predetermined time and then selects an antenna to transmit data.

FIG. 4 shows an example that a period, 2 TTs, for a transmitting side to receive a fed-back antenna index is equal to a period for transmitting a reference signal via each antenna through switching. In particular, FIG. 4 depicts that switching of an antenna for transmitting data by having an antenna index fed back from a receiving side is carried out as soon as reference signals are transmitted via antennas through switching at TTI indexes 0, 2, 4, 6, 8, . . . , respectively. Namely, an antenna index fed back from a receiving side using a reference signal transmitted via each antenna for TTI 0 is an index corresponding to Tx2. So, data is transmitted via Tx2 for TTI 2. In a same manner, an antenna for transmitting data is selected as Tx1 for TTI 4, Tx2 for TTI 6, or Tx2 for TTI 8.

In the above description for FIG. 4, it can be observed that the transmitting side selects an antenna to be used for data transmission using the fed-back information each period for having an antenna index fed back. In the following description, it is assumed that a period represented as 'antenna index feedback period' has the same meaning of 'period for selecting a data transmitting antenna'.

According to the above-mentioned closed-loop type antenna switching, spatial diversity can be obtained more efficiently rather than open-loop switching that switches transmitting antennas randomly. And, by performing additional switching for each transmission unit to obtain channel information of a transmitting antenna not used for data transmission, more accurate channel information can be obtained rather than a method (case 'AS-1' in FIG. 11 to be described) of obtaining channel information of each transmitting antenna by artificially switching data transmitting antennas periodically.

Besides, FIG. 4 represents an example of a system having two antennas and a single RF chain, which is applicable to a system having transmitting antennas more than 2 by the same principle.

Figure 5:
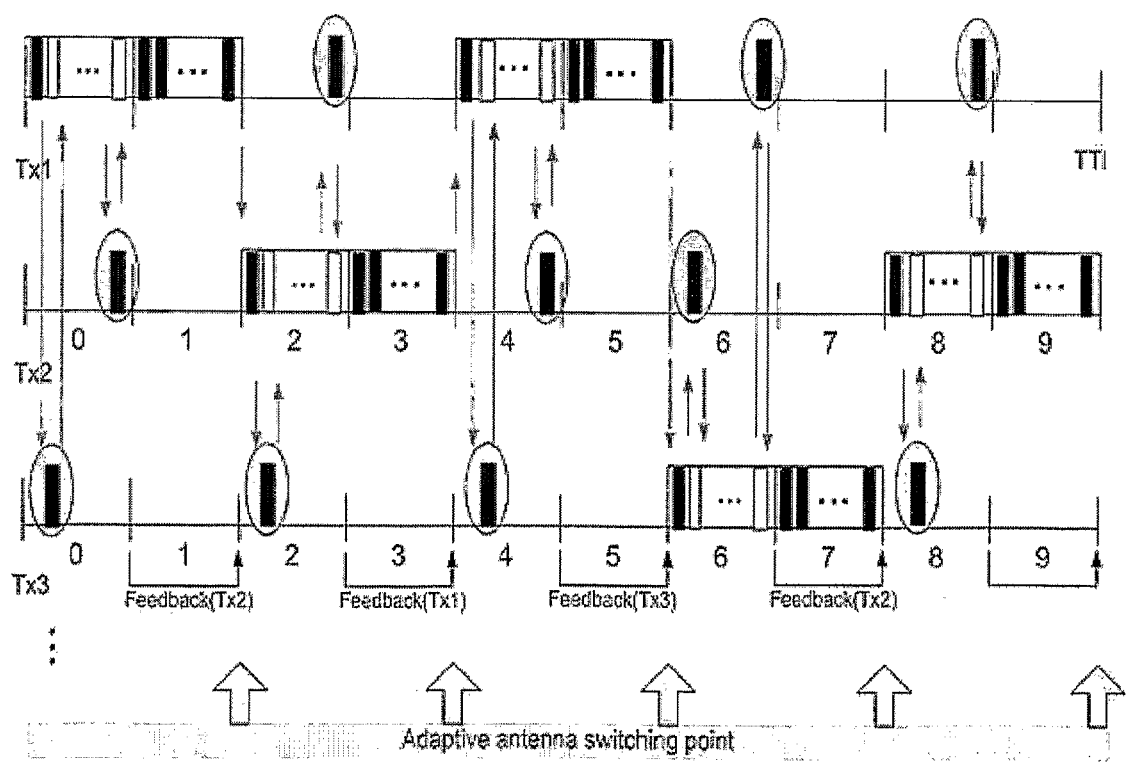
FIG. 5 is a diagram for a general example in operating a resource allocation module and a switching module in a closed-loop antenna switching system according to one embodiment of the present invention, in which a plurality of transmitting antennas are used.

FIG. 5 is a diagram for the generalized example in operating a resource allocation module and a switching module in a closed-loop antenna switching system according to one embodiment of the present invention, in which a plurality of transmitting antennas are used.

In particular, FIG. 5 depicts an example that a reference signal is transmitted via each transmitting antenna through additional switching according to one embodiment of the present invention and that antenna switching is carried out in accordance with correspondingly received feedback antenna index information, in a system using a plurality of transmitting antennas Tx1, Tx2, Tx3, . . . . In FIG. 5, it is assumed that a period for receiving feedback information is two TTIs. And, it is also assumed that the number of reference signals inclusive within a single TTI is equal to or greater than the number of transmitting antennas. Moreover, in FIG. 5, a mark attached to each feedback information indicates an antenna index included in the corresponding feedback information.

Referring to FIG. 5, an antenna to transmit data is selected using feedback information received in a TTI index 0, 2, 4, 6, 8, . . . . Simultaneously, a reference signal is transmitted via each transmitting antenna by additional antenna switching. In particular, an antenna index, which is fed back from a receiving side in accordance with a reference signal transmitted via each antenna in TTI 0, is an antenna index corresponding to Tx2. So, data is transmitted via Tx2 in TTI 2. And, in TTI 2, a reference signal is transmitted via each transmitting antenna by additional switching. By the same method, FIG. 5 depicts that antenna switching is carried out using Tx1 in TTI 4, Tx3 in TTI 6, and Tx2 in TTI 8. Moreover, FIG. 5 shows that switching is carried out in an additional switching sequence (Tx1 to Tx3 and then Tx1 to Tx2) for reference signal transmission in TTI 0 and also shows a specific switching sequence in TTI2, TTI 4, . . . . Yet, the additional switching sequence needs not to be limited to a specific sequence and may follow a sequence different from that shown in FIG. 5.

According to one embodiment of the present invention relevant to FIG. 4 or FIG. 5, switching for changing a reference signal transmitting antenna is additionally carried out to obtain feedback information on an antenna index as well as switching for a data transmitting antenna selection.

In particular, incase case that a single RF chain exists (case that the number of antenna capable of transmitting data and/or reference signal simultaneously is 1), a count of additional switching generated from transmitting reference signals using antennas alternately can be represented as follows.

$$\left(\left\lfloor \frac{TTI}{T_{AntF\_B}} \right\rfloor + 1\right) \cdot (N_T - 1) \cdot 2 \qquad \text{[Formula 1]}$$

In Formula 1, $T_{AntF\_B}$ indicates a period for a receiving side to determine and feed back an antenna index and NT indicates the number of transmitting antennas. And, it is assumed that an index of TTI starts from 0.

The above-mentioned additional antenna switching may cause power loss in proportion to its count. In general, a reference signal transmitted together with data includes a reference signal (data modulation-reference signal: DM-RS) used as a reference signal for data decoding. According to the above-mentioned embodiment in which reference signals transmitted via an antenna for transmitting data are reduced, performance may be degraded in data decoding.

Another embodiment of the present invention proposes a method of performing antenna switching more flexibly in a manner of setting a period for transmitting a reference signal via each transmitting antenna to a prescribed multiple of a period for receiving feedback information by additional switching and then adjusting the set period in accordance with a moving speed of UE and/or the like, which is described in detail as follows.

Figure 6:
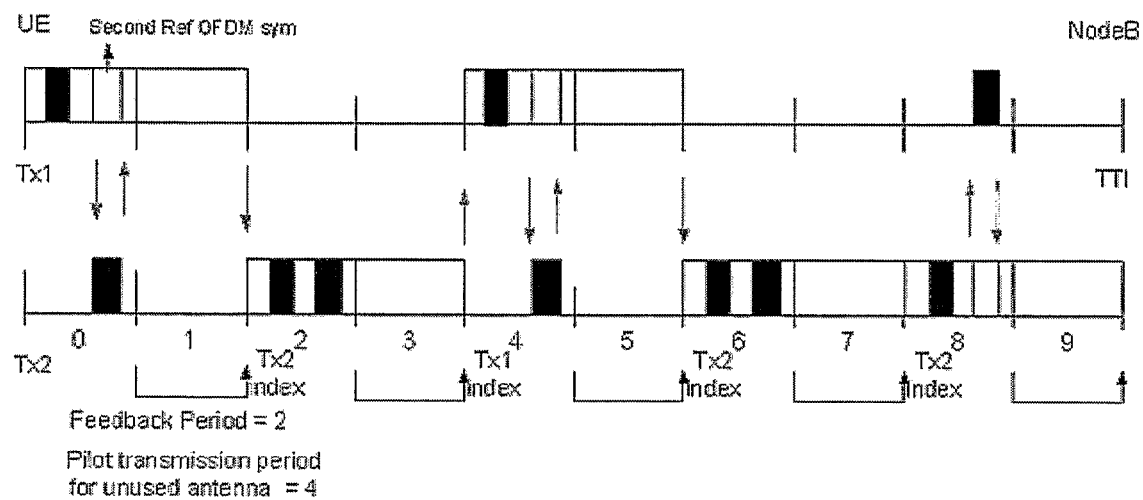
FIG. 6 is a diagram for details in operating a resource allocation module and a switching module in a closed-loop antenna switching system according to another embodiment of the present invention, in which two transmitting antennas are used.

FIG. 6 is a diagram for details in operating a resource allocation module and a switching module in a closed-loop antenna switching system according to another embodiment of the present invention, in which two transmitting antennas are used.

An overall system configuration relevant to the present embodiment is identical to that of the closed-loop antenna switching system shown in FIG. 4 except operations of a resource allocation module and a switching module.

FIG. 6 shows a configuration of a system having two transmitting antennas Tx1 and Tx2 and a single RF chain, in which data and/or reference signals are transmitted via each antenna for example. In this case, a delay for an antenna index to be fed back to a transmitting side from a receiving side amounts to a time taken to transmit a single packet (1 TTI represented in the example shown in FIG. 6). In this case, the packet may have a single subcarrier structure or a structure that utilizes a plurality of subcarriers like OFDM system.

Unlike the aforesaid embodiments shown in FIG. 4 and FIG. 5, FIG. 6 shows that a period for having an antenna index fed back (i.e., antenna selection period) is different from a period for transmitting a reference signal via each transmitting antenna by additional switching. In particular, FIG. 6 shows an example that a period for transmitting a reference signal via each transmitting antenna by additional antenna switching is set to 4 TTIs that is twice greater than 2 TTIs of a period for receiving feedback information.

Namely, in one embodiment of the present invention described with reference to FIG. 4 and FIG. 5, a reference signal is loaded in a packet by alternating antennas with each other for each period for feeding back an antenna index determined by measuring a quality of channel undergone by each antenna. On the other hand, in another embodiment of the present invention described with reference to FIG. 6, instead of loading a reference signal alternately for each antenna index feedback period, a count of switching antennas is reduced in a manner of transmitting reference signals alternately after predetermined duration (prescribed multiple of antenna index feedback period). Consequently, power loss attributed to additional antenna switching can be effectively reduced. In particular, in FIG. 6, additional switching is not carried out to transmit a reference signal via each transmitting antenna in TTI index 2, 6, . . . corresponding to a period for feeding back an antenna index from a receiving side. Instead, additional switching is carried out to enable a reference signal to be transmitted via an antenna, by which data is not transmitted, in TTI index 0, 4, 8, . . . so the period for additional antenna switching becomes twice greater than the antenna index feedback period.

In the present embodiment, the number of reference signals included within a single TTI may range 1 to a plural number. Preferably, the number of the reference signals is equal to or greater than the number of transmitting antennas. A single TTI can be constructed with a plurality of sub-slots and at least one or more reference signals can exist within each of the sub-slots.

In one embodiment of the present invention described with reference to FIG. 6, assuming that a period for performing additional switching to transmit reference signals via each transmitting antenna is set to $T_{PilotTrans}$, then a period $T_{AntF.B}$ for having an antenna index fed back from a receiving side has the following relation with $T_{PilotTrans}$.

$$T_{PilotTrans} = F \cdot T_{AntF.B} \quad \text{[Formula 2]}$$

In Formula 2, 'F' may be an integer equal to or greater than 2. If 'F' is 1, this embodiment gets identical to the former embodiment described with reference to FIG. 4 or FIG. 5.

If 'F' is incremented in Formula 2, power loss can be reduced by lowering a count of additional antenna switching that is additionally performed for reference signal transmission via each transmitting antenna. And, data decoding performance of the corresponding antenna can be enhanced as well. On the other hand, if 'F' gets increased greater than a prescribed multiple, it is unable to accurately feed back a channel status of each transmitting antenna. Hence, link performance of system may get degraded.

Preferably, according to one embodiment of the present invention, a value of 'F' is incremented to a level for maintaining link performance of system over a prescribed level, as a result, a count of additional switching for reference signal transmission via each transmitting antenna is decremented.

For instance, in case that a transmitting side using a plurality of antennas is a UE, if a speed of the corresponding UE is high, a channel status in accordance with each of the antennas rapidly varies. So, if a feedback period is elongated by considering the channel status per the antenna, link performance of system gets further degraded. Hence, one detailed embodiment of the present invention proposes that a value of 'F' is set to a small value by considering a moving speed of the UE having a high speed or that a value of 'F' is set to a large value by considering a moving speed of the UE having a low speed.

In case that a period $T_{AntF.B}$ for feeding back an antenna index is basically long, a period for deciding a channel status of each transmitting antenna becomes elongated. So, system performance may get degraded. Hence, in case that an antenna index feedback period it self is long, it may be preferable that a value of 'F' is set to a small value.

Meanwhile, except a time for transmitting a packet that uses antennas alternately, a packet for carrying data without additional switching within the packet needs not to load a reference signal on a different antenna unused for transmitting the data but loads all reference signals in the packet for carrying the data. So, in decoding the data within the corresponding packet, more reference signals are usable, whereby decoding performance can be enhanced.

If there exists a single RF chain according to the above-described embodiment of the present invention, an additional switching count for transmitting a reference signal via each antenna can be represented as the following formula.

$$\left(\left\lfloor \frac{TTI}{T_{PilotTrans}} \right\rfloor + 1\right) \cdot (N_T - 1) \cdot 2 = \quad \text{[Formula 3]}$$

$$\left(\left\lfloor \frac{TTI}{T_{AntF.B} \cdot F} \right\rfloor + 1\right) \cdot (N_T - 1) \cdot 2$$

In Formula 3, it is also assumed that an index of TTI starts from 0.

In the above-described example according to one embodiment of the present invention with reference to FIG. 6, the case of using two transmitting antennas is explained. This can be generalized into a case that a system includes a plurality of antennas.

Figure 7:
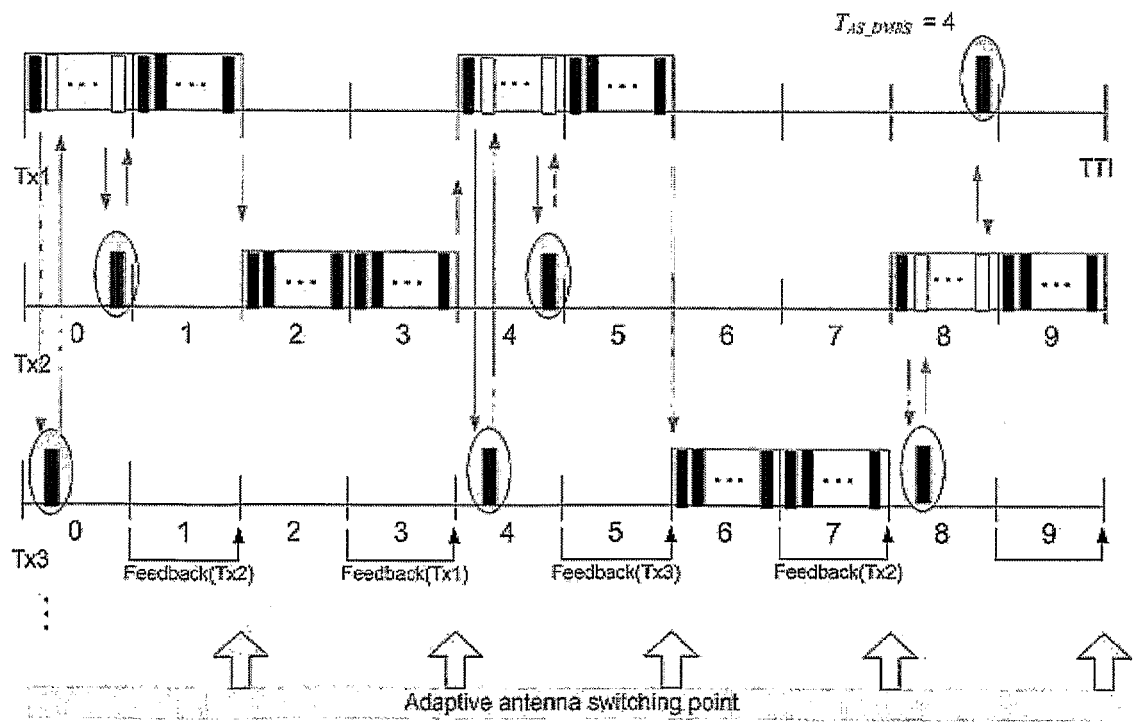
FIG. 7 is a diagram for a general example in operating a resource allocation module and a switching module in a closed-loop antenna switching system according to one embodiment of the present invention, in which a plurality of transmitting antennas are used.

FIG. 7 is a diagram for a general example in operating a resource allocation module and a switching module in a closed-loop antenna switching system according to one embodiment of the present invention, in which a plurality of transmitting antennas are used.

FIG. 7 depicts an example that reference signals are transmitted via each transmitting antenna by additional switching by a period twice greater than a period for receiving antenna index feedback information in a system using a plurality of transmitting antennas Tx1, Tx2, Tx3, . . . according to one embodiment of the present invention. Namely, in FIG. 7, it is assumed that a period for receiving feedback information is 2 TTIs. It is assumed that a period for performing additional switching for transmitting reference signals via each transmitting antenna is 4 TTIs. And, it is assumed that the number of reference signals inclusive within a single TTI is equal to or greater than the number of transmitting antennas.

Referring to FIG. 7, a selection for an antenna to transmit data is carried out using feedback information received in TTI index 0, 2, 4, 6, 8, . . . . Yet, additional switching for reference signal transmission is carried out in the TTI index 0, 4, 8, . . . corresponding to a value twice greater than a feedback information reception period only. FIG. 7 shows an example that additional switching for reference signal transmission is made to proceed in specific order. Unlike FIG. 7, a sequence of antennas switched in the additional switching may follow a random order, which is already explained with reference to FIG. 5.

A method of generating feedback information from a receiving side according to one embodiment of the present invention described with reference to FIG. 6 and FIG. 7 is explained as follows.

First of all, a receiving side transmits feedback information including a selected antenna index to be used for transmission to cope with each feedback information reception period of a transmitting side. If a TTI corresponding to a period $T_{AntF.B}$ for the transmitting side to receive the feedback information corresponds to a period $T_{PilotTrans}$ for the transmitting side to transmit a reference signal via each antenna by additional antenna switching, the receiving side receives all transmission reference signals per the antenna received in TTI of the corresponding index and then generates an antenna index having a best channel environment into feedback information through the received transmission reference signals.

On the other hand, if a TTI corresponding to a period $T_{AntF.B}$ for the transmitting side to receive the feedback information does not correspond to a period $T_{PilotTrans}$ for the transmitting side to transmit a reference signal via each antenna by additional antenna switching, the receiving side compares channel information by a reference signal of a data transmitting antenna received in TTI of a corresponding index to channel information by a reference signal, which was transmitted by the transmitting side in TTI corresponding to previous $T_{PilotTrans}$ and then stored in the receiving side, via a different transmitting antenna. The receiving side then generates an antenna index having a best channel environment into feedback information. For this, the receiving side preferably stores channel information via a reference signal of each antenna transmitted in the TTI corresponding to $T_{PilotTrans}$.

In particular, referring to FIG. 7, since a receiving side is able to obtain channel information on all transmitting antennas within a corresponding TTI in TTI 0, 4, 8, . . . which correspond to a feedback index reception period $T_{AntF.B}$ of a transmitting side and also corresponds to a period $T_{PilotTrans}$ for performing additional antenna switching for reference signal transmission via each transmitting antenna, an antenna index having a best channel environment to cope with a next feedback information reception period can be selected and then transmitted as feedback information.

On the other hand, in TTI 2, 6, ..., which corresponds to a feedback index reception period $T_{AntF.B}$ of a transmitting side but does not correspond to an additional antenna switching period $T_{PilotTrans}$ for reference signal transmission, a receiving side is able to obtain channel information on an antenna for transmitting data in the corresponding TTI but is unable to obtain channel information on another transmitting antenna. So, by comparing previously stored channel information on another antenna to a channel environment of a data transmitting antenna of the corresponding TTI, it is able to transmit an antenna index having a best channel environment to cope with a next feedback information reception period.

A detailed example of applying the above-described embodiments of the present invention to 3GPP LTE (long term evolution) system is explained as follows.

Figure 8:
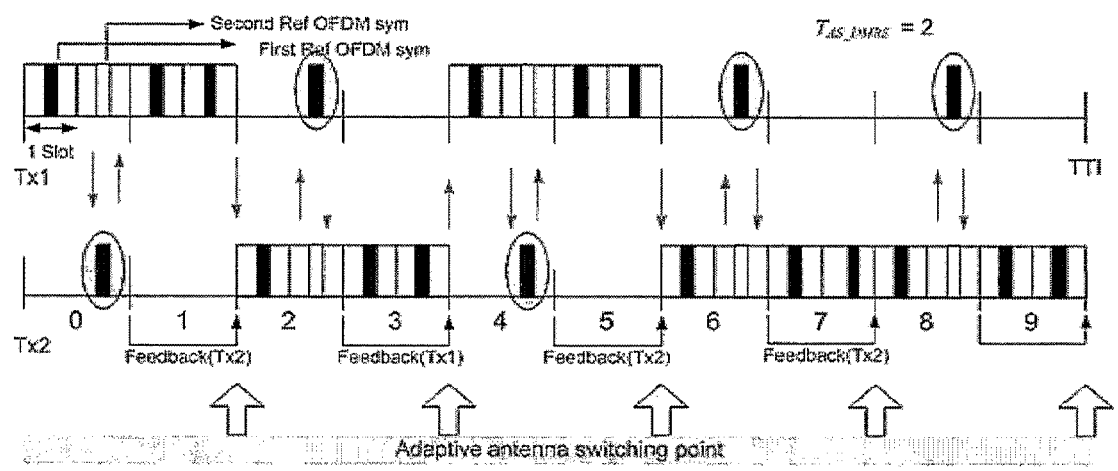
FIG. 8 is a diagram of an example for applying a closed-loop antenna switching method according to one embodiment of the present invention to 3GPP LTE system.

FIG. 8 is a diagram of an example for applying a closed-loop antenna switching method according to one embodiment of the present invention to 3GPP LTE system.

Referring to FIG. 8, in case of 3GPP LTE uplink system, and more particularly, SC-FDMA (single carrier-frequency division multiple access) system, two sub-slots construct a single TTI and each of the sub-slots has a single OFDM symbol for a reference signal in-between. So, transmission is carried out in a manner that total two OFDM symbols for reference signal are provided within a single TTI.

FIG. 8 depicts an example on the assumptions of two transmitting antennas, a single RF chain usable at a time, an antenna index feedback period of 2 TTIs, and a feedback delay of 1 TTI. Of course, as a generalized case, in case that a plurality of transmitting antennas and a plurality of RF chains are used, the same principle of the example shown in FIG. 8 is applicable. Moreover, a method of loading a reference signal symbol in a single packet can exist in various ways. And, in transmitting reference signals by alternating antennas, this method is applicable to all transmission schemes for transmitting some of the reference signals via a data transmitting antenna and transmitting the reset of the reference signals via another antenna.

In particular, in FIG. 8, a packet for transmitting data carries a first reference signal OFDM symbol by a period, 2 TTIs, for feeding back an antenna index, i.e., in TTI index 0, 2, 4, 6, 8, ... and a second reference signal OFDM symbol is transmitted via another antenna by antenna switching. Meanwhile, in TTI not corresponding to a period for feeding back an antenna index, i.e., TTI having a TTI index 1, 3, 5, 7, ..., all reference signal OFDM symbols are loaded in a packet for carrying data only. Alternately, unlike FIG. 8, a first reference signal OFDM symbol and a second OFDM symbol in each packet can be transmitted by being switched to each other. Namely, a packet for transmitting data for each antenna index feedback period carries a second reference signal OFDM symbol and a first reference signal OFDM symbol can be transmitted via another antenna by antenna switching. Besides, in the example shown in FIG. 8, a reference signal can be transmitted via each transmitting antenna by antenna switching for each feedback information reception period.

A process for determining an antenna index by estimating a quality of channel of each antenna in a receiving side is explained as follows. First of all, a receiving side compares and calculates channel information using a reference signal OFDM symbol of each antenna transmitted by the antenna index feedback period shown in FIG. 8 and is then able to decide an index of an antenna having a better channel quality as an antenna index to be used for a next frame. Since reference signals are transmitted via all transmitting antennas for each antenna index feedback period in the example shown in FIG. 8, it is able to obtain channel information on all antennas in the corresponding TTI.

According to the above embodiment of the present invention described with reference to FIG. 8, it is able to obtain channel information on a transmitting antenna as well as a data transmitting antenna. Hence, it is able to obtain spatial diversity more efficiently. For this, additional power loss may be caused if a reference signal is transmitted for each antenna index feedback period by additional switching via an antenna except a data transmitting antenna. And, data decoding performance of the corresponding period may be degraded.

Explained in the following description is an example for setting an antenna index feedback period to differ from a period for transmitting a reference signal via each transmitting antenna using additional antenna switching according to another embodiment of the present invention.

Figure 9:
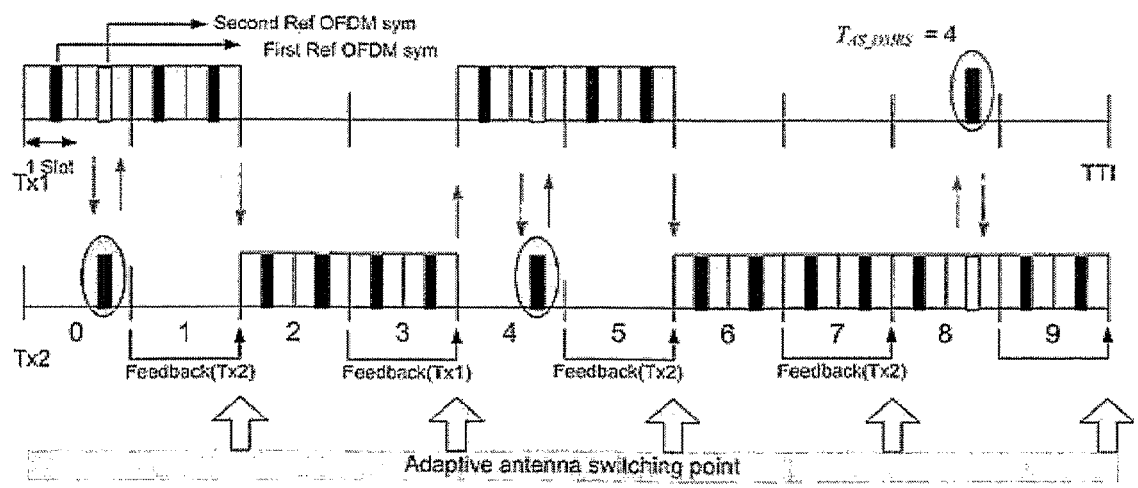
FIG. 9 and FIG. 10 are diagrams of examples for applying a closed-loop antenna switching method according to another embodiment of the present invention to 3GPP LTE system, respectively.
Figure 10:
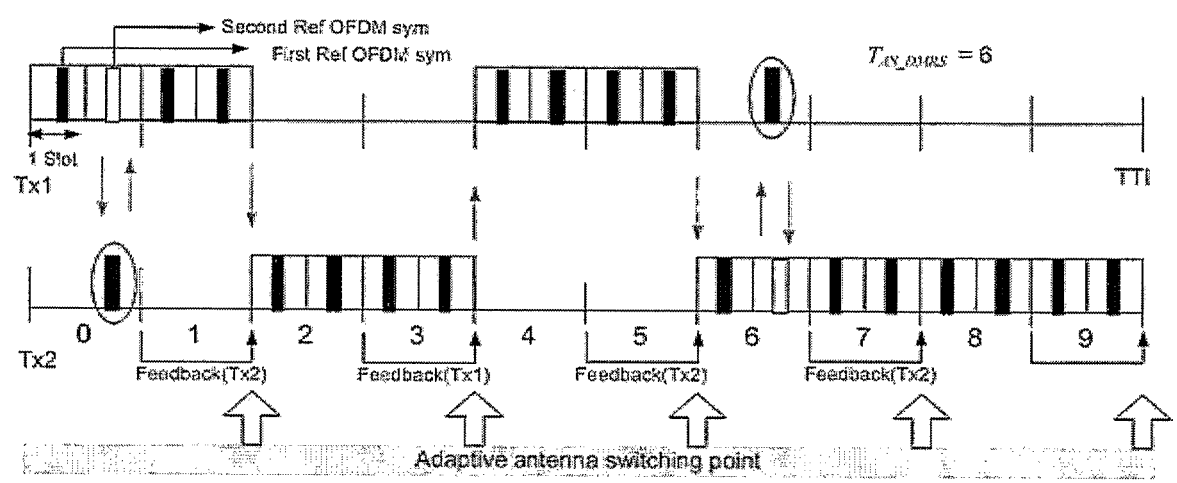

FIG. 9 and FIG. 10 are diagrams of examples for applying a closed-loop antenna switching method according to another embodiment of the present invention to 3GPP LTE system, respectively.

In FIG. 9 or FIG. 10, two sub-slots construct a single TTI in accordance with 3GPP LTE uplink system and each of the sub-slots has a single OFDM symbol for a reference signal in-between. So, transmission is carried out using total two reference signal OFDM symbol within a single TTI.

FIG. 9 or FIG. 10 depicts an example on the assumptions of two transmitting antennas, a single RF chain usable at a time, an antenna index feedback period of 2 TTIs, and a feedback delay of 1 TTI. Yet, unlike the example shown in FIG. 8, in the example shown in FIG. 9 or FIG. 10, a period for enabling a reference signal to be transmitted via each transmitting antenna by additional antenna switching is not identical to an antenna index feedback period. FIG. 9 shows a case that the former index is twice greater than the latter period (i.e., 4 TTIs). FIG. 10 shows a case that the former index is twice greater than the latter period (i.e., 6 TTIs).

In particular, in FIG. 9 or FIG. 10, a packet for transmitting data for each period (multiple of antenna index feedback period) for transmitting each reference signal OFDM symbol via antenna alternately transmits a first reference signal OFDM symbol and also transmits a second reference signal OFDM symbol via another antenna. Of course, the first reference signal OFDM symbol and the second reference signal OFDM symbol can be transmitted by being switched to each other. Namely, a packet for transmitting data for each antenna index feedback period transmits a second reference signal OFDM symbol and also transmits a first reference signal OFDM symbol via another antenna.

Meanwhile, in TTI which is not a period for transmitting reference signal OFDM symbol alternately by antenna switching, all reference signal OFDM symbols are carried by a packet for transmitting data only. In the case shown in FIG. 9 or FIG. 10, this TTI includes a TTI, which corresponds to an index feedback period but does not correspond to a period for performing switching to transmit a reference signal via an antenna except a data transmitting antenna, and a TTI not corresponding to the antenna index feedback period.

In particular, in case of FIG. 9, a feedback period of an antenna index corresponds to 2 TTIs. So, a transmitting side receives antenna indexes fed back from a receiving side at TTI indexes 0, 2, 4, 6, 8, .... And, a period for additional switching occurrence to transmit a reference signal via a transmitting antenna except a data transmitting antenna corresponds to 4 TTIs twice greater than the period for having the antenna index fed back. So, one of tow reference signals within a single packet is transmitted via a different antenna except a data transmitting antenna at TTI index 0, 4, 8, . . . .

And, in case of FIG. 10, a feedback period of an antenna index corresponds to 2 TTIs. So, a transmitting side receives antenna indexes fed back from a receiving side at TTI indexes 0, 2, 4, 6, 8, . . . . And, a period for additional switching occurrence to transmit a reference signal via a transmitting antenna except a data transmitting antenna corresponds to 4 TTIs three times greater than the period for having the antenna index fed back. So, one of tow reference signals within a single packet is transmitted via a different antenna except a data transmitting antenna at TTI index 0, 6, . . . .

on the condition that the 'F' is set to various values for a case that an antenna index feedback period is identical to a period for performing additional antenna switching to transmit a reference signal via an antenna except a data transmitting antenna according to one embodiment of the present invention as mentioned in the foregoing description of FIG. 8 (hereinafter named 'first embodiment' for convenience of description) and a case that a period for transmitting a reference signal via a transmitting antenna except a data transmitting antenna is set to a prescribed multiple (F) of an antenna index feedback period according to another embodiment of the present invention (hereinafter named 'second embodiment'), a count of additional switching occurrences in accordance with the number of transmitted TTIs can be represented as follows.

TABLE 1

|  | 10 (0~9) TTIs transmitted | | | 1000 (0~9999) TTIs transmitted | | | 100000 (0~99999) TTIs transmitted | | |
| --- | --- | --- | --- | --- | --- | --- | --- | --- | --- |
| $1^{st}$ Embodiment | 10 | | | 1000 | | | 100000 | | |
| $2^{nd}$ Embodiment | F = 2 6 | F = 4 4 | F = 10 2 | F = 2 502 | F = 4 252 | F = 10 102 | F = 2 50002 | F = 4 25002 | F = 10 10002 |

Meanwhile, according to the embodiment of the present invention shown in FIG. 9 or FIG. 10, a process for determining an antenna index by estimating a quality of a channel of each antenna is explained as follows. First of all, since it is able to obtain channel information on all antennas in TTI which corresponds to a period for performing switching to transmit a reference signal via an antenna except a data transmitting antenna as well as corresponds to an antenna index feedback period, a receiving side generated feedback information by selecting an antenna having a best channel quality via the channel information of each antenna obtained through the corresponding TTI as an antenna to be used for a next data transmission.

On the other hand, since it is unable to obtain channel information on an antennas except a data transmitting antenna in TTI which corresponds to an antenna index feedback period but does not correspond to a period for performing switching to transmit a reference signal via the antenna except the data transmitting antenna, it is able to select an antenna having a better channel quality as an antenna to be used for a next data transmission by comparing channel information in accordance with the reference signal received via the data transmitting antenna within the corresponding TTI to previously stored channel information on a different antenna.

Unlike the former embodiment of the present invention descried with reference to FIG. 8, according to one embodiment of the present invention described with reference to FIG. 9 or FIG. 10, it is able to reduce an additional antenna switching count for transmitting a reference signal via a transmitting antenna except a data transmitting antenna. And, performance degradation can be prevented in a manner of adjusting the additional switching count to be maintained on a level which enables link performance of a corresponding system to be maintained on a predetermined level.

FIG. 9 depicts the example that the additional switching period is twice greater than the antenna index feedback period according to one embodiment of the present invention (i.e., 'F' in Formula 2 is 2). And, FIG. 10 depicts the example that the additional switching period is three times greater than the antenna index feedback period according to one embodiment of the present invention (i.e., in Formula 2 is 3). Meanwhile, Namely, the additional antenna switching count according to the second embodiment of the present invention can be reduced smaller than that of the first embodiment. In particular, if 'F' is set to a large number for a case that a channel variation of each antenna is not considerable or the like, the additional antenna switching count can be further reduced.

In the following description, simulation results to confirm a presence or non-presence of link performance enhancement on various conditions according to the above-described embodiments of the present invention are explained.

FIGS. 11 to 14 are graphs for FER performance comparisons between a related art antenna switching method and a switching method according to each embodiment of the present invention in accordance with various antenna switching periods, modulation schemes and UE speeds, respectively.

In FIGS. 11 to 14, 'Single antenna' indicates a case that a single antenna is used as a transmitting antenna. And, 'Open-Loop AS' indicates a case that antenna switching is carried out by open-loop switching using a plurality of transmitting antennas. Moreover, 'AS-1' indicates a case that data transmitting antennas are periodically switched to obtain channel information on an antenna unused for data transmission (Number of TTIs right to an index indicates a data transmitting antenna switching period.).

Besides, 'first embodiment' indicates a case that additional switching for reference signal transmission is carried out to obtain channel information on an antenna unused for data transmission according to one embodiment of the present invention and also indicates a case that a period of the additional switching is identical to an antenna index feedback period. And, 'second embodiment' indicates a case that an additional switching period for reference signal transmission in the first embodiment corresponds to an integer (F) multiple of an antenna index feedback period according to another embodiment of the present invention.

Figure 11:
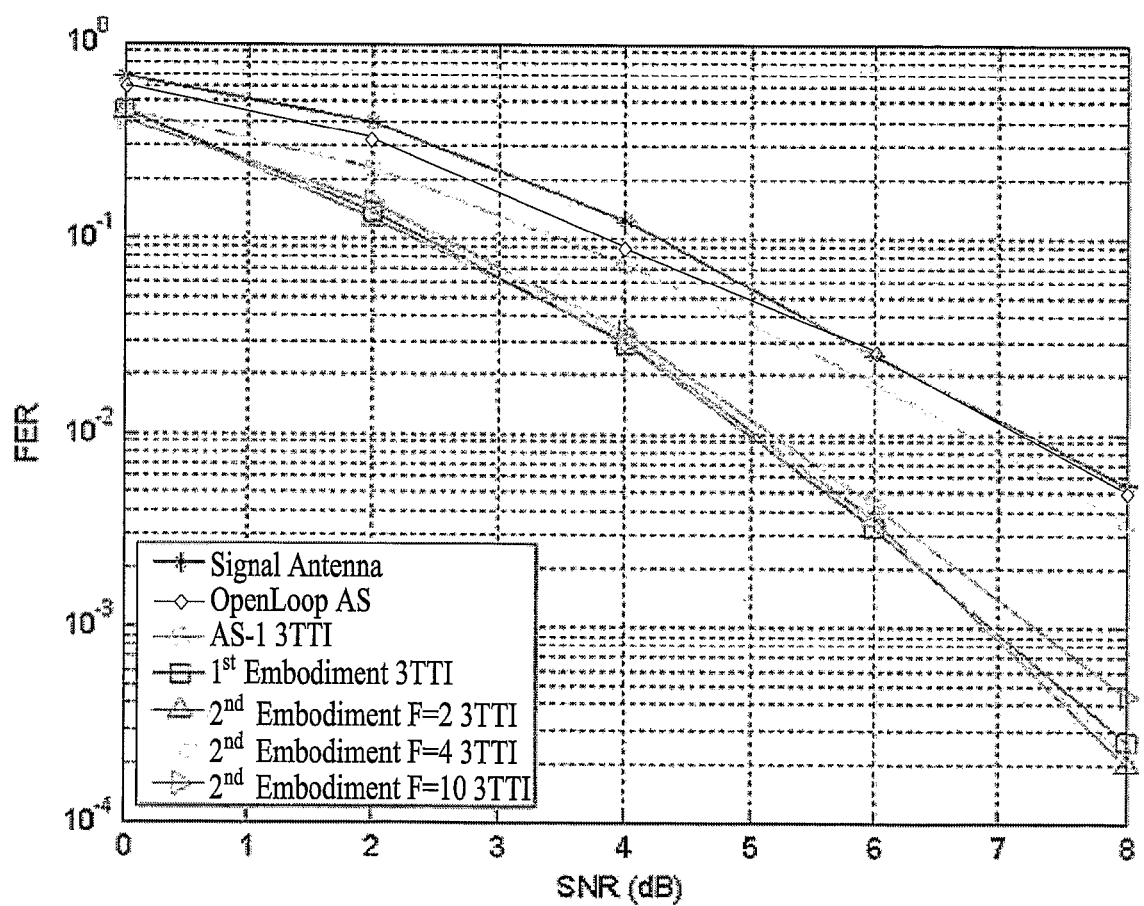
FIGS. 11 to 14 are graphs for FER performance comparisons between a related art antenna switching method and a switching method according to each embodiment of the present invention in accordance with various antenna switching periods, modulation schemes and UE speeds, respectively.

Meanwhile, FIG. 11 shows comparison of FER (frame error rate) performance for the respective cases on the condition that a transmitting side is a UE, that a speed of the UE is 3 km/h, that QPSK and 1/2 coding rate are applied to modulation and coding schemes, respectively and that each antenna index feedback periods for 'first embodiment' and 'second embodiment' is 3 TTI.

Referring to FIG. 11, it can be observed that the case by open-loop antenna switching (OpenLoop AS) has performance similar to the case of using a single antenna. And, it is also observed that the case of 'AS-1' has performance more slightly enhanced than the former cases.

On the other hand, the case of 'first embodiment' utilizes channel information on each transmitting antenna more accurately to have performance enhancement much better than those of the aforesaid cases. In case that the additional switching count is decremented variously in accordance with values of according to the 'second embodiment' of the present invention, it can be observed that almost similar performance appears despite that the additional switching count is decremented lower than that of the 'first embodiment'. And, it can be also observed that a case of setting 'F' to '10' (F=10) shows that FER indicates a performance difference of 0.2 dB at $10^{-2}$.

Figure 12:
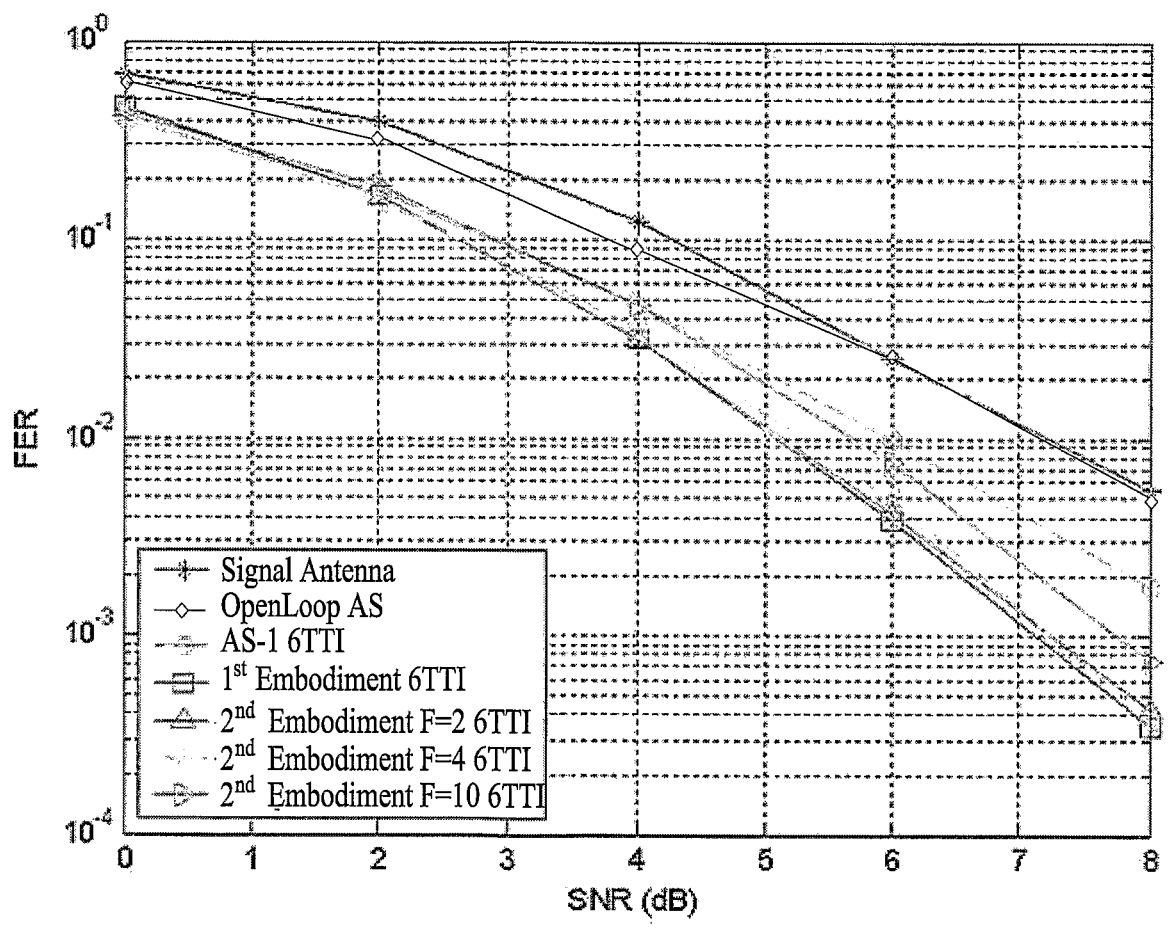

FIG. 12 depicts comparison of link performance between the respective cases on the same condition of FIG. 11 except that an antenna index feedback period is incremented to 6 TTI for 'First embodiment' and 'second embodiment'.

Referring to FIG. 12, it can be observed that a performance difference is similar to that shown in FIG. 11. Yet, compared to the performance difference shown in FIG. 11, a performance difference between the 'first embodiment' and the 'second embodiment' slightly increases. This implies that the performance difference is proportional to a value of 'F'. Preferably, in the 'second embodiment' of the present invention, a ratio (F) of an additional switching period for reference signal transmission to an antenna index feedback period is set to a small number in case that the antenna index feedback period is long.

Figure 13:
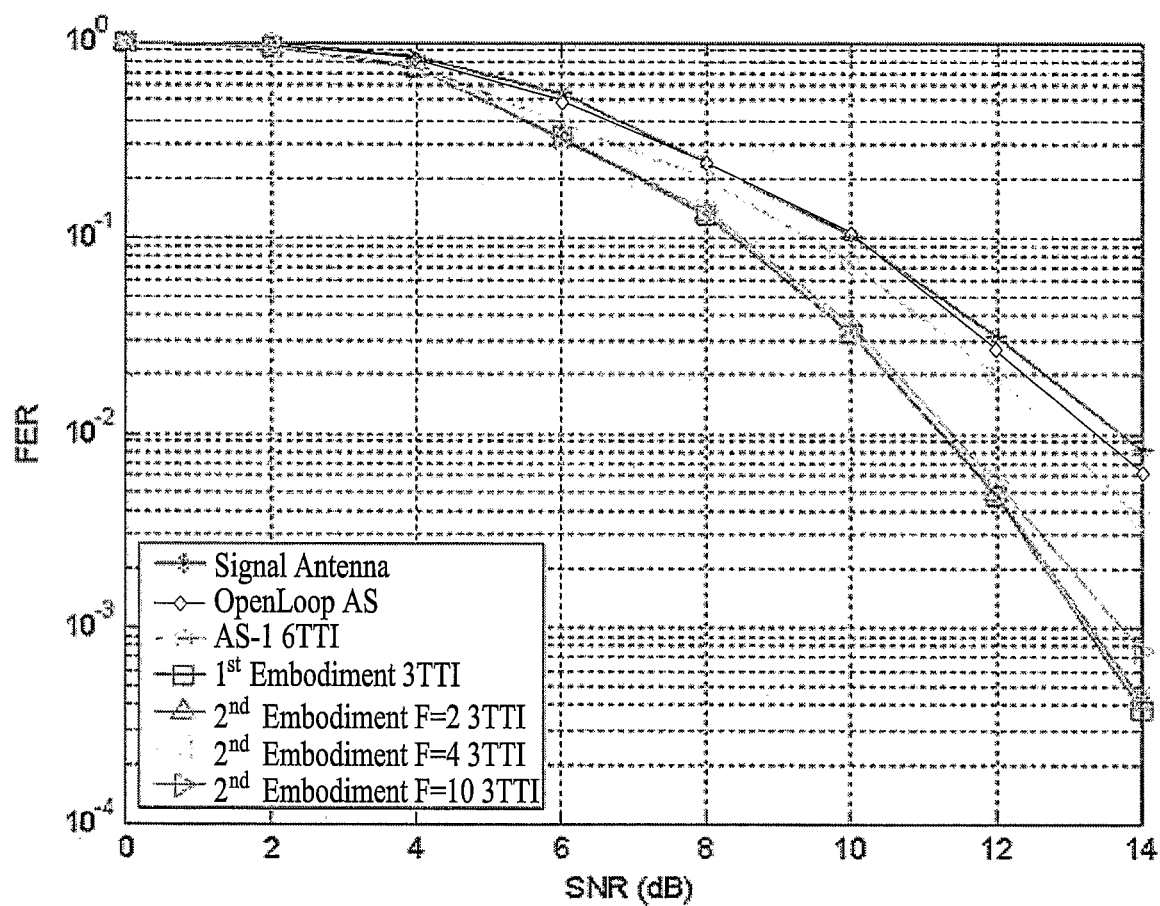

FIG. 13 shows a case of applying the same antenna index feedback period as shown FIG. 11 and using 16QAM as modulation scheme instead of QPSK. Comparing a result of FIG. 13 to that of FIG. 11, it can be observed that there exists no big performance difference between the respective cases including the performance difference between the 'first embodiment' and 'second embodiment' of the present invention even if a modulation rate is increased.

Figure 14:
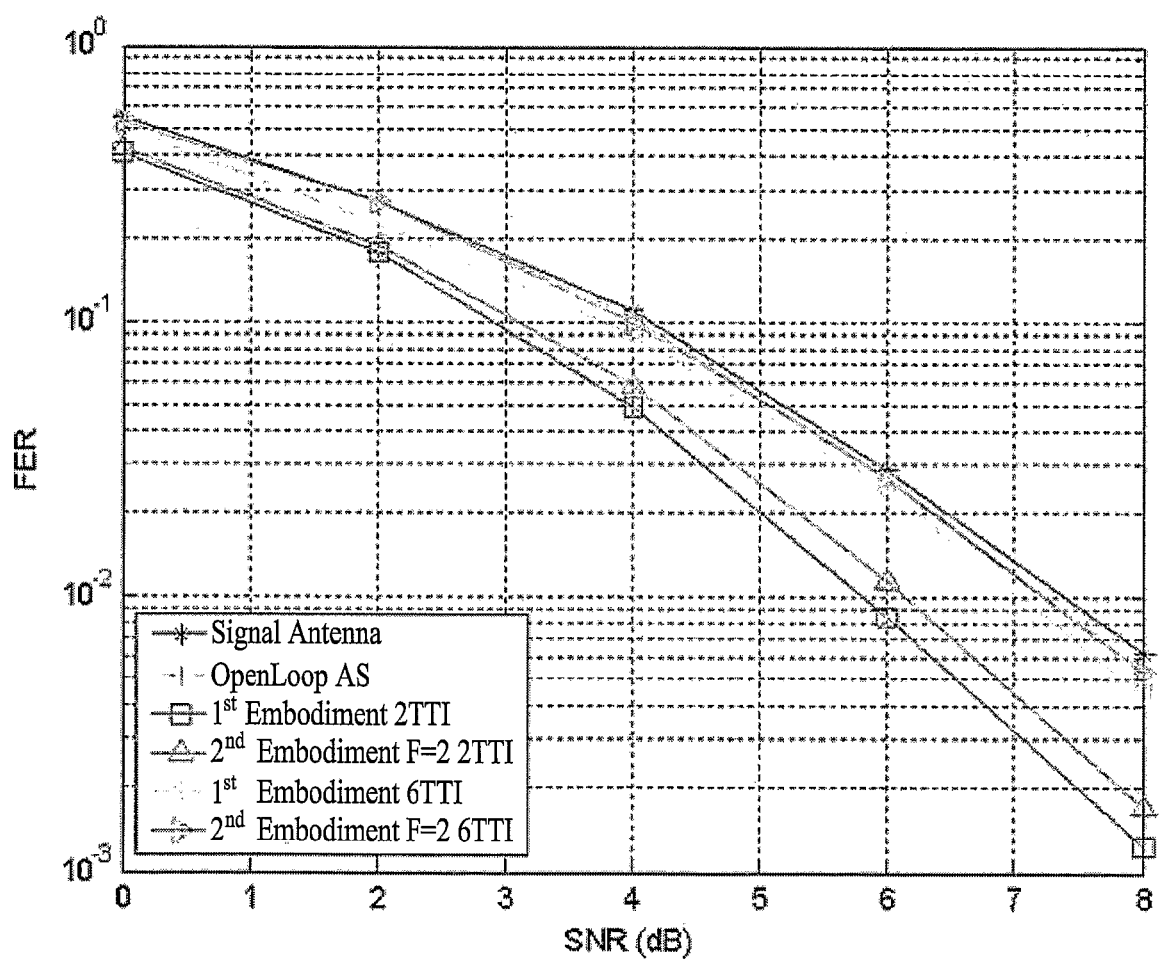

Unlike the case of FIG. 11, FIG. 14 exemplarily shows a case that a speed of UE is 30 km/h. In particular, QPSK and 1/2 coding rate are applied to modulation and coding schemes, respectively. And, 2 TTI and 6 TTI are applied to antenna index feedback periods, which are respectively represented in the drawing.

Referring to FIG. 14, in case that a speed of UE is high, if an antenna index feedback period is set long (6 TTI), it can be observed that a performance difference between a single antenna system (or, open-loop antenna switching system) and the first or second embodiment of the present invention is reduced. In case that an antenna index feedback period is set short, if a value of 'F' is set small (F=2) in the second embodiment, it can be observed that a performance difference between the first and second embodiments is not considerable.

For clarity and convenience of description, in case that data is transmitted via each antenna, details for a band for transmitting data are omitted in the description of the above embodiments. In the following description, a method of transmitting a reference signal for antenna switching by considering a transmission band of each antenna according to another embodiment of the present invention is explained.

Figure 1:
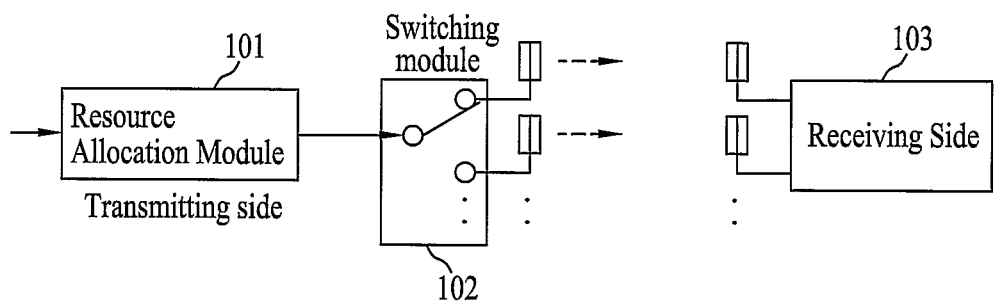
FIG. 1 is a block diagram for a configuration of an open-loop antenna switching system.
Figure 2:
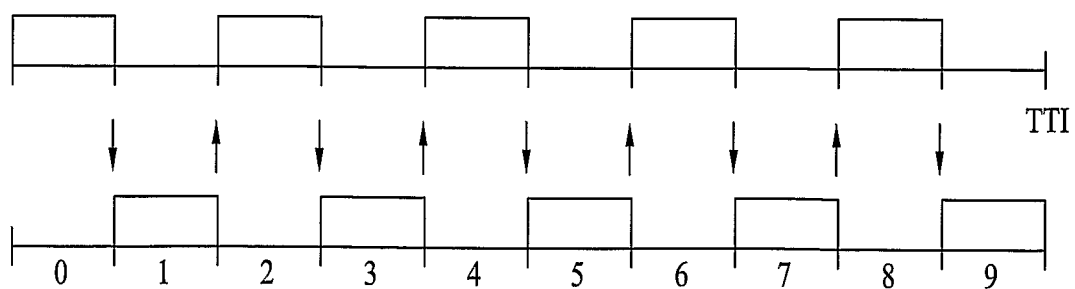
FIG. 2 is a diagram for details in operating a resource allocation module and a switching module in the open-loop antenna switching system shown in FIG. 1.

First of all, in all systems for transceiving signals using a plurality of transmitting and receiving antennas, the structure shown in FIG. 1 corresponds to a small number of RF chains for transmission by switching transmitting antennas.

In particular, an uplink closed-loop antenna switching system has a structure that a transmitting side sequentially (or, randomly or by giving a predetermined weight to a period of antenna to use) selects an antenna and/or a transmission band to transmit data and then transmits data and sounding reference signal (hereinafter abbreviated 'SRS').

Namely, the resource allocation module 101 among the transmitting side elements shown in FIG. 1 plays a role in determining to output a frequency or time and a space (antenna) for transmitting a packet. And, the switching module 102 sequentially (or randomly) selects an antenna and/or a transmission band and then transmits the packet received from the resource allocation module 101, for each transmission. Thus, operations of the resource allocation module 101 and the switching module 102 are explained in detail by considering the data transmission band selection as well as the antenna selection as follows.

Figure 15:
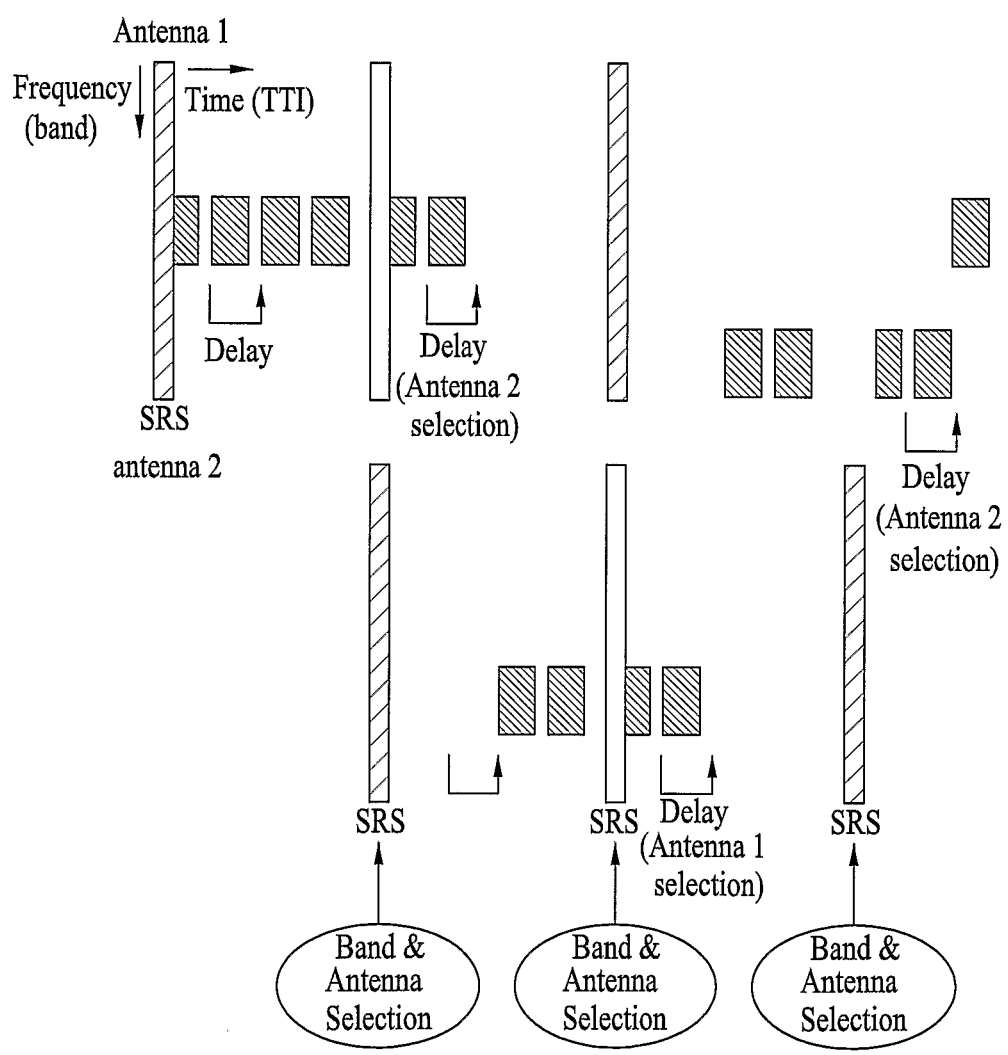
FIG. 15 is a diagram for a method of transmitting SRS in a general closed-loop antenna switching system.

FIG. 15 is a diagram for a method of transmitting SRS in a general closed-loop antenna switching system.

In particular, FIG. 15 depicts a method of transmitting data and SRS via an uplink packet in a system including two transmitting antennas and a single RF chain for example. The following description deals with an example that data and SRS are transmitted in uplink. Yet, the same mechanism is applicable to a case in downlink.

First of all, the SRS is transmitted to be used in performing a band selection to enable data information to be transmitted by a UE in a good channel environment. FIG. 15 shows an example that a single band-selected UE transmits data and SRS. A band and an antenna to be used by a UE are determined in a manner of sequentially and alternately transmitting SRS for each period for band selection and determination of an antenna to use. In this case, an order for determining a band and antenna to be used by a UE depends on how a base station corresponding to a receiving side in uplink operates. In particular, an antenna can be determined after a band to be used by a UE has been determined, and vice versa. Of course, both of the antenna and the band can be simultaneously determined.

In the system shown in FIG. 15, since a single antenna (or a small number of antennas amounting to a number of RF chains) is usable for signal transmission at the same time, it is unable to send SRS via two or more antennas simultaneously. If so, it is unable to avoid a delay of long duration to secure all SRS transmitted via the respective antennas used for antenna switching. Hence, Doppler frequency increases (mobility of UE increases) to degrade performance.

In particular, in the example shown in FIG. 15, to perform antenna switching in a first one of three band and antenna selection periods shown in the drawing, it is able to use SRS of an antenna 2 received at a timing point of the corresponding period and SRS of an antenna 1 received at a timing point of a previous period preceding the corresponding period.

In this case, there is a problem in using SRS ahead of one period for the antenna 1. And, there occurs a problem that a delay of one period is necessary to secure SRS received from both of the two antennas.

Meanwhile, if more SRSs are sent to reduce the above-mentioned delay, a size of data to be transmitted is reduced. Hence, there occurs a problem that a data rate is reduced. In order to perform antenna switching, in case that SRS is transmitted via a different antenna unused for transmitting data packets, old channel information is used for at least one of the antennas in performing band selection and antenna selection in the corresponding period. Hence, it is unable to avoid performance degradation attributed to Doppler frequency.

Figure 16:
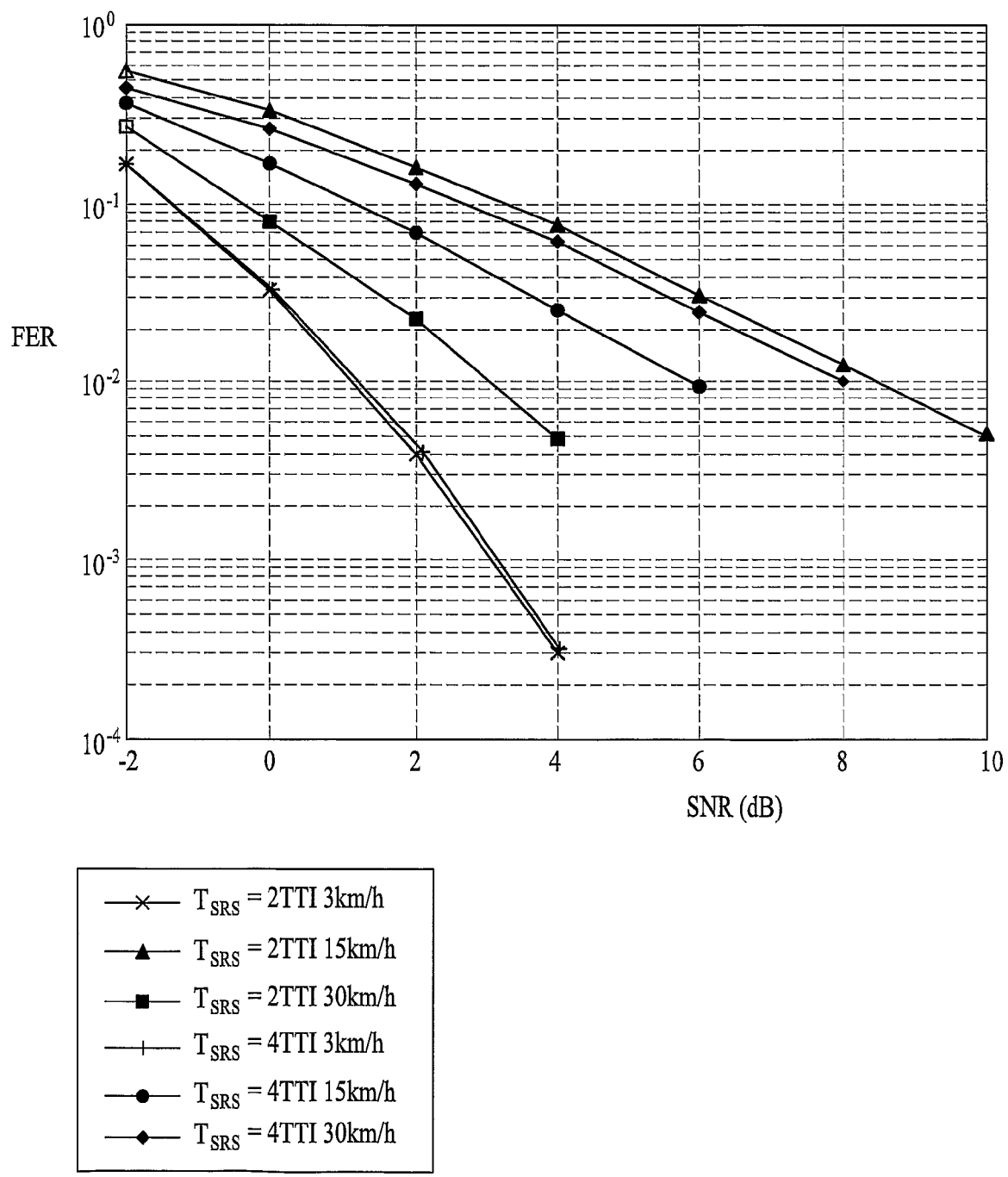
FIG. 16 is a graph for explaining performance degradation attributed to a sounding reference signal transmission period and user's mobility in a general closed-loop antenna switching system.

FIG. 16 is a graph for explaining performance degradation attributed to a sounding reference signal transmission period and user's mobility in a general closed-loop antenna switching system.

In FIG. 16, a horizontal axis indicates a signal to noise ratio (SNR) and a vertical axis indicates a frame error rate (hereinafter abbreviated FER). In FIG. 16, $T_{SRS}$ indicates a period for transmitting SRS and the number of TTI indicates a time taken to transmit frames amounting to the corresponding number. In FIG. 16, a case that a best band is allocated to a single user in band selection is assumed.

Referring to FIG. 16, it can be observed that FER of a case of an SRS transmission period of 4 TTI is higher than that of 2 TTI. And, it is also observed that FER gets higher if mobility of user becomes incremented by 3 km/h, 15 km/h, 30 km/h, or the like.

Thus, in the general closed-loop antenna switching system, if SRS transmission period is increased or if user's mobility gets increased, FER performance is degraded.

According to one embodiment of the present invention, an antenna switching gain is increased by decreasing a delay required for reference signal acquisition used for antenna switching. Hence the present invention proposes a signal transmitting method and an antenna selection information generating method using the same.

A general structure of an antenna switching system according to one embodiment of the present invention is identical to the configuration of the general antenna switching system shown in FIG. 1 but is characterized in that both SRS signal and DMRS to be simultaneously utilized are transmitted in sending a reference signal to perform antenna switching. This is explained in detail with reference to FIG. 17.

Figure 17:
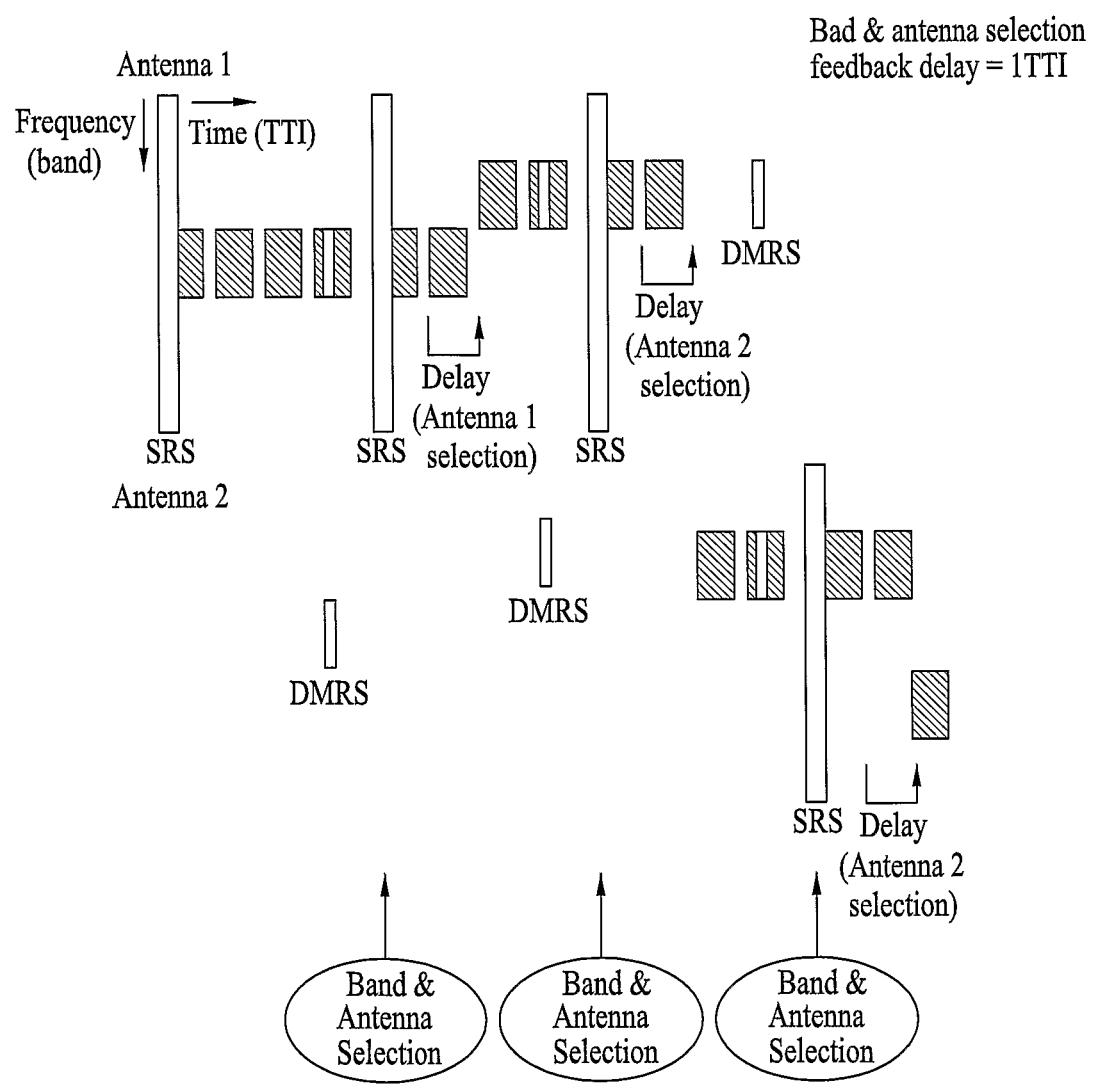
FIG. 17 is a diagram for a method of transmitting a reference signal for antenna switching in a closed-loop antenna switching system according to one embodiment of the present invention.

FIG. 17 is a diagram for a method of transmitting a reference signal for antenna switching in a closed-loop antenna switching system according to one embodiment of the present invention.

In particular, FIG. 17 is a diagram to implement operations of a resource allocation module and an antenna switching module in an antenna switching system, in which data and reference signal (SRS and DMRS) are transmitted via respective antennas in a system having two transmitting antennas and a single RF chain. Although FIG. 17 shows an example of using a single RF chain, it is understood that the same principle shown in FIG. 17 is applicable to a system having more transmitting antennas and more RF chains.

At least one or more reference signals can exist within a packet for transmitting data. A single packet can be constructed with a plurality of subframes and at least one or more reference signals can exist within each of the subframes.

In the following description, the antenna switching system shown in FIG. 17 is described as an example of an uplink system, to which one embodiment of the present invention is not limited. And, it is understood that one embodiment of the present invention is applicable to a downlink system in the same manner.

In an uplink system, a transmitting side transmits data on a band of an antenna selected using usable band information and usable antenna index information fed back from a receiving side. The receiving side determines a band and antenna index to be used by the transmitting side and then feeds back the determined band and antenna index to the transmitting side. In doing so, a reference to determine an antenna index to be used can be determined by one of various methods such as a method of selecting an antenna having a best channel quality by measuring a quality of channel undergone by each antenna, a method of selecting an antenna that maximizes capacity, and the like. And, a reference to determine a band to be used can be determined by one of various methods as well. By utilizing theses methods, accuracy of feedback information is raised by lowering the number RF chains used for data transmission. Hence, it is able to effectively obtain spatial diversity like using a plurality of antennas.

An operational process shown in FIG. 17 is explained in detail as follows.

First of all, a transmitting side (UE in case of uplink) transmits a packet for each band selection period by loading SRS on the packet. And, a receiving side (base station in case of uplink) determined a band for UE's transmission by utilizing the SRS and then feeds back the determined band to the transmitting side. In this case, the SRS can be transmitted via an antenna for transmitting data only. Alternatively, the SRS can be transmitted in a manner of giving a predetermined weight per an antenna alternately or randomly.

According to one embodiment of the present invention, it is proposed that a transmitting side transmits a DMRS (or a plurality of DMRSs) between band selection periods via a different antenna for not transmitting data to be used in generating antenna information to be used by a receiving side.

In the related art, SRS is utilized to determine an antenna to be used only. Yet, in the above-described embodiment of the present invention, since SRS can be sent in a period for sending the SRS by simultaneously utilizing both SRS and DMRS in antenna switching, a band selection gain can be raised. And, it is able to solve the related art problem of the delay for antenna switching information acquisition (this problem is sensitive to Doppler effect.) in a manner of using DMRS transmitted between SRS transmission periods. Since it is in general that DMRS is transmitted together with data via an antenna for transmitting data, DMRS is transmitted via an antenna for not transmitting data between every band selection periods. Hence, it is able to prevent antenna selection from being carried out using considerably old channel information in a manner of utilizing the DMRS via the antenna for not transmitting the data.

In summary of the above-described embodiment of the present invention, SRS for band selection is transmitted each band selection period and band selection is then carried out using the SRS. And, at least one of DMRSs of a UE packet in SRS transmission period transmitted on a selected band is transmitted via a different antenna unused for data transmission, and more particularly, on a band used for data transmission by a different antenna unused for data transmission, which can be utilized in determining an antenna to be used for a next transmission.

Meanwhile, according to one preferred embodiment of the present invention, as mentioned in the above description, by considering that DMRS is transmitted via an antenna for not transmitting data on a data transmission band of a data transmitting antenna, it is proposed that at least one DMRS is transmitted every time a data transmission band is changed between every band selection periods. Thus, in a manner of transmitting DMRS via an antenna for not transmitting data every time a data transmission band of a data transmitting antenna is changed, a receiving side is able to obtain all information on a corresponding band of the antenna for not transmitting the data. This enables antenna switching to be performed more efficiently.

In this aspect, in the above-described method according to one embodiment of the present invention, DMRS can be transmitted through any packet between band selection periods (this may be identical/different to/from a period for transmitting SRS). Namely, after a band to be used for data transmission has been determined due to occurrence of selection for a data transmission band, a DMRS transmitting timing point can be set to anytime. Thus, a transmitting side is able to transmit at least one DMRS in every band selection period.

Accordingly, the receiving side obtains information on an antenna determined for an SRS transmission period or a band selection period and information on a band to use and then transmits the information via downlink control signaling for delivering scheduling information or via another random control channel.

In this case, a method for the receiving side to determine an antenna to use can exist in various ways. For instance, in case that an antenna for receiving SRS and an antenna for receiving DMRS differ from each other between band selection periods, there may exist a method of comparing DMRS information received between previous band selection periods to SRS information received in a present period.

And, there may also exist a method of comparing SRS information received in a previous SRS transmission period to DMRS received between the previous SRS transmission period and a present SRS transmission period.

Moreover, by comparing each channel information, a timing point of occurrence of antenna switching may correspond to a timing point determined by a base station (or eNodeB). Alternatively, a UE performs switching by determining information sent by eNodeB and then informs the eNodeB of the timing point through signaling or the like.

According to the above-described embodiment of the present invention, it is able to compensate for performance degradation attributed to Doppler frequency increased as user's mobility is increased or an SRRS transmission period is elongated. A following simulation result relates to verification of an extent to compensate for FER performance degradation in case of SRS transmission period of 2 TTI/4 TTI and user's mobility of 3/15/30 km/h.

Figure 18:
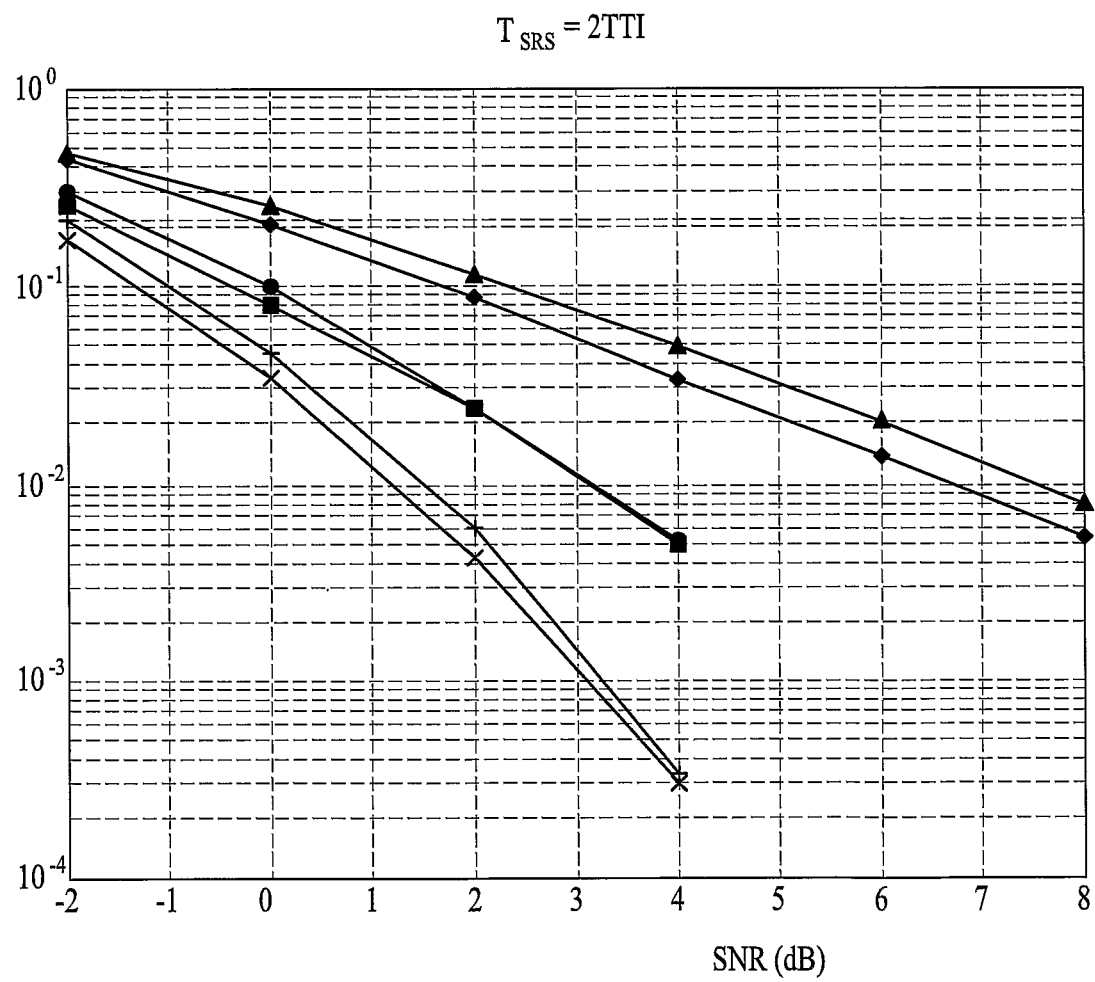
FIG. 18 and FIG. 19 are graphs to explain that performance degradation is compensated for in accordance with a transmission period of SRS and user's mobility in case of employing a method of transmitting a reference signal for antenna switching according to one embodiment of the present invention.
Figure 18:
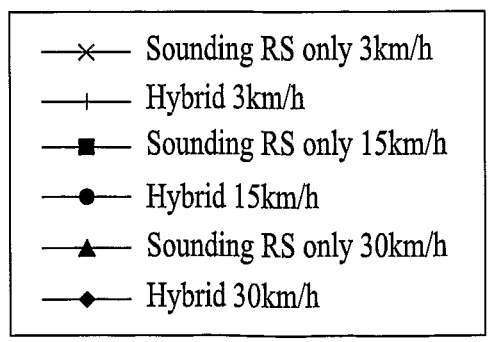
Figure 19:
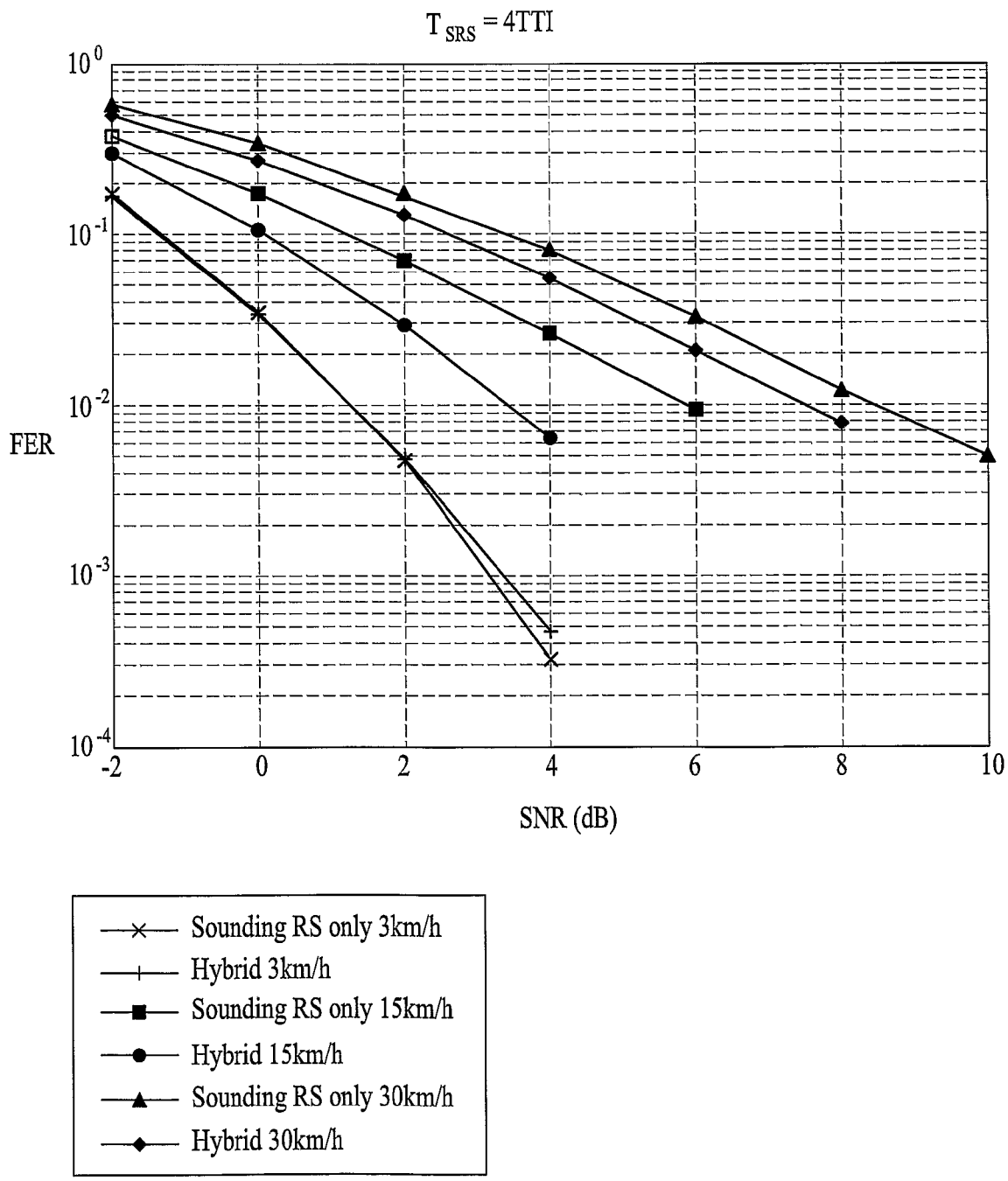

FIG. 18 and FIG. 19 are graphs to explain that performance degradation is compensated for in accordance with a transmission period of SRS and user's mobility in case of employing a method of transmitting a reference signal for antenna switching according to one embodiment of the present invention.

In FIG. 18 or FIG. 19, like FIG. 16, a horizontal axis indicates SNR and a vertical axis indicates FER. In the simulation shown in FIG. 18 or FIG. 19, a band selection is carried out on the assumption that a best band is allocated to a single user.

In FIG. 18 or FIG. 19, 'Sounding RS only' indicates a method of performing antenna switching using SRS only according to a related art and 'Hybrid' indicates a method of performing antenna switching using both SRS and DMRS according to one embodiment of the present invention.

Referring to FIG. 18, in case that an SRS transmission period is 2 TTI, when user's mobility is big like 30 km/h, it can be observed that the method according to the present embodiment has FER performance more considerably enhanced than that of the related art method of using SRS only.

Referring to FIG. 19, in case that an SRS transmission period is 4 TTI, when user's mobility is big like 15 km/h or 30 km/h, it can be observed that the method according to the present embodiment has FER performance more considerably enhanced than that of the related art method of using SRS only.

In case that user's mobility is small (specifically, a case that SRS transmission period is short), an additional gain attained from using the method according to the present embodiment may not be considerable. Yet, by performing the antenna switching according to the present embodiment overall, it is advantageous in that a long SRS transmission period and big mobility of user can be supported.

From the result shown in FIG. 18 or FIG. 19, it can be observed that performance results of the related art and the present invention may differ in accordance with the big mobility of user or the small mobility of user. According to one preferred embodiment of the present invention, it is proposed that DMRS transmission due to additional switching is carried out in accordance with an extent of mobility of user.

In particular, in case that user's mobility is small, antenna switching is carried out using general SRS transmission only without transmitting a DMRS reference signal by switching to another antenna. In case that user's mobility is equal to or greater than a prescribed threshold, it is able to use an adaptive RS transmission scheme to which the present embodiment is applied. In this case, information on user's mobility can be utilized in a manner of being fed back by various conventional schemes.

Other embodiments of the present invention using the above-described concept are explained in the following description.

According to another embodiment of the present invention, assuming that an antenna index generated from antenna selection information generation by a receiving side is transmitted by separate downlink signaling instead of being sent to cope with a scheduling period, a scheme of generating antenna selection information at a timing point of receiving DMRS is proposed. This scheme is explained in detail with reference to FIG. 20.

Figure 20:
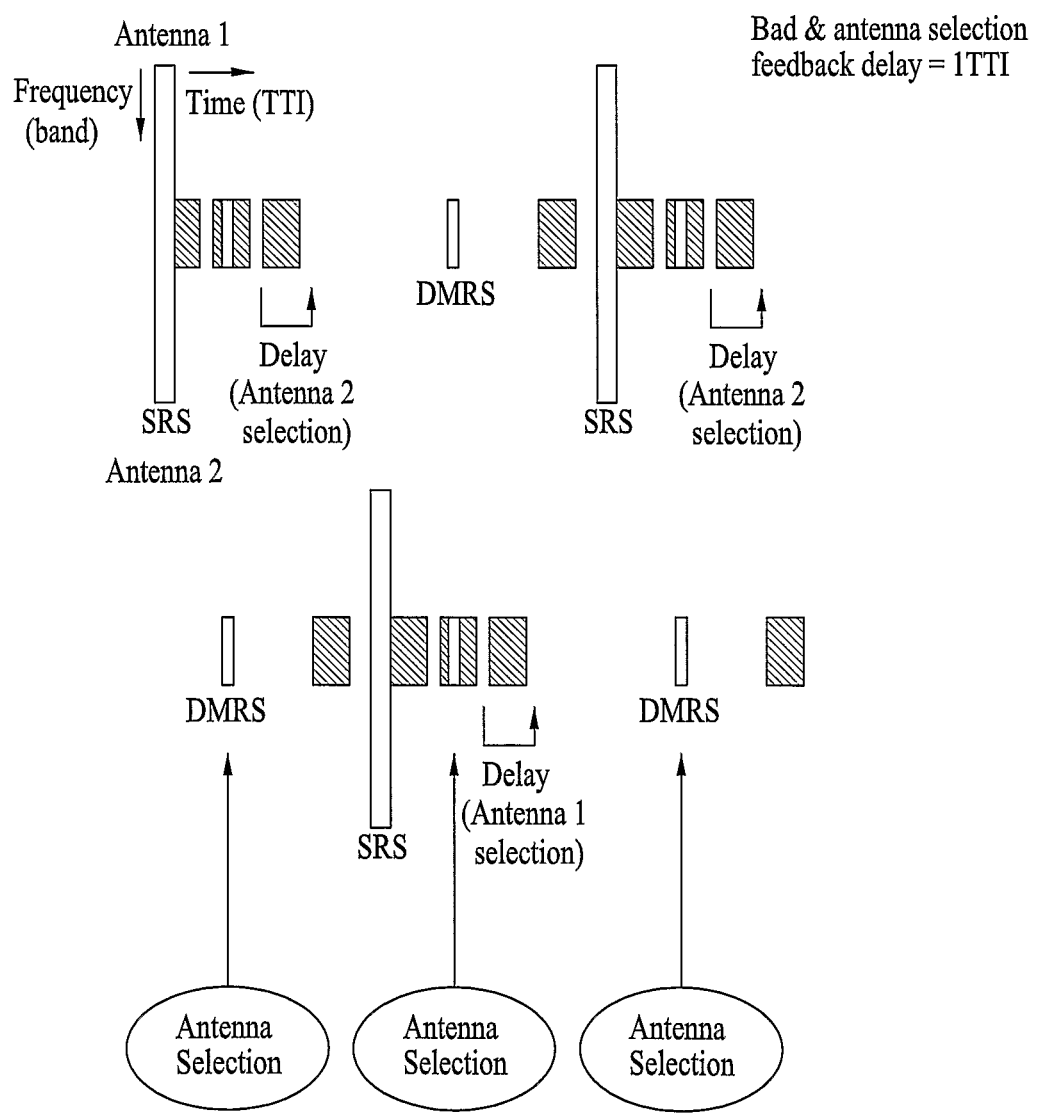
FIG. 20 is a diagram for a method of transmitting a reference signal for antenna switching in a closed-loop antenna switching system according to another embodiment of the present invention.

FIG. 20 is a diagram for a method of transmitting a reference signal for antenna switching in a closed-loop antenna switching system according to another embodiment of the present invention.

Referring to FIG. 20, similar to the above-described embodiment, the present embodiment enables DMRS to be transmitted between every SRS transmission periods via an antenna for not transmitting data. Yet, the present invention proposes the following scheme. First of all, antenna selection in a receiving side is not carried out as soon as band selection is carried out. Instead, an antenna index to transmit data is determined by comparing channel information via DMRS to channel information of SRS received in a previous period at a timing point of receiving the DMRS. The determined antenna index is then transmitted not by downlink scheduling relevant signaling but by separate downlink signaling.

According to the above-described scheme, it may be disadvantageous in that separate signaling is required for antenna selection information transmission. Yet, since a timing of performing antenna switching can be faster than that of the above-described methods, it is advantageous in that it can be more robust against user's mobility.

According to a further embodiment of the present invention, proposed is a scheme of transmitting SRS at each band selection timing point and transmitting DMRS between the band selection timing points via an antenna for not transmitting SRS in a previous period.

Although SRS is normally transmitted via an antenna for transmitting data, it is able to set SRS to be transmitted via a different antenna for each period. Under this circumstance, in case that an antenna for transmitting SRS in a specific period is identical to an antenna for transmitting DMRS by additional switching, a gain obtained from transmitting DMRS by additional switching may be reduced.

Thus, as mentioned in the foregoing description, by transmitting DMRS via an antenna not transmitting SRS at a previous period timing point, it is able to maximize a DMRS transmission gain. In case that DMRS transmission is carried out via an antenna for not transmitting data, DMRS transmission is carried out by additional switching. In case that DMRS transmission is carried via an antenna for transmitting data, DMRS can be transmitted together with data via a corresponding antenna without additional switching.

In the above descriptions of the respective embodiments of the present invention, it is mainly assumed that a transmitting side is a UE. Yet, it is apparent to those skilled in the art that the principle of the above-mentioned explanation for each of the embodiments is applicable to a random transmitting side having difficulty in having a plurality of RF chains due to complexity and the like of configuration and also having difficulty in transmitting data via a plurality of antennas simultaneously.

In the above descriptions, a case that a transmission unit for transmitting data is a single TTI is mainly explained for example. And, it is understood that a transmission unit for transmitting data may be set to a plurality of TTI units, a sub-slot unit constructing the TTI, or a plurality of sub-slots.

In the above descriptions of the respective embodiments of the present invention, a case that the number of reference signals transmittable by a single data transmission unit is equal to or greater than the number of transmitting antennas is mainly explained. In some cases, it may be necessary to recognize a channel environment of each transmitting antenna by utilizing limited reference signals.

For instance, in 3GPP LTE system, if the number of reference signals included within 1 TTI is limited to 2, a transmitting side using four transmitting antennas is unable to transmit reference signals via all transmitting antennas within the corresponding TTI. In this case, it is able to transmit reference signals via all the four transmitting antennas in a manner of allocating two reference signals to four transmitting antennas alternately by each transmission unit or having a transmitting side provided with two RF chains.

INDUSTRIAL APPLICABILITY

Accordingly, an antenna switching method and a signal transmitting and receiving method for the same according to various embodiments of the present invention are applicable to various wireless communication systems that use antenna switching and reference signal transmission for the antenna switching as well as to the aforesaid 3GPP LTE system.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of performing an antenna switching for data transmission by a transmission end in a communication system using a plurality of transmission antennas, the method comprising:

transmitting a first reference signal and a plurality of second reference signals via a transmission antenna transmitting data;

transmitting at least one second reference signal among the plurality of second reference signals via at least one transmission antenna not transmitting data, by switching the transmission antenna when to transmit the at least one second reference signal, when a mobility of a user is larger than a prescribed threshold;

receiving feedback signals in response to the transmitted first and second reference signals; and performing the antenna switching by selecting a transmission antenna for the data transmission among the plurality of transmission antennas based on the received feedback signals, wherein an interval of transmitting the at least one second reference signal is determined based on the mobility of the user, and wherein a number of reference signals within a transmission unit for the data transmission is equal to or greater than a number of the plurality of transmission antennas.

2. The method of claim 1, wherein the first and each of the plurality of the second reference signals are a data demodulation reference signal (DMRS).

3. The method of claim 1, wherein the transmission unit is either at least one transmission time interval (TTI) or at least one sub-slot.

4. The method of claim 1, wherein an interval of transmitting the first reference signal is determined by considering a length of an antenna selection period for selecting the transmission antenna for the data transmission.

5. The method of claim 1, wherein the first reference signal is a sounding reference signal (SRS) and each of the plurality of the second reference signals is a data demodulation reference signal (DMRS).

6. An apparatus for performing an antenna switching for data transmission, having a plurality of transmission antennas, the apparatus comprising:

a switching module configured to transmit a first reference signal and a plurality of second reference signals via a transmission antenna transmitting data, and configured to transmit at least one second reference signal among the plurality of second reference signals via at least one transmission antenna not transmitting data, by switching the transmission antenna when to transmit the at least one second reference signal, when a mobility of a user is larger than a prescribed threshold; and a resource allocation module configured to perform the antenna switching by selecting a transmission antenna for the data transmission among the plurality of transmission antennas based on received feedback signals in response to the transmitted first and second reference signals, wherein an interval of transmitting the at least one second reference signal is determined based on the mobility of the user, and wherein a number of reference signals within a transmission unit for the data transmission is equal to or greater than a number of the plurality of transmission antennas.

* * * * *